US 6,625,866 B2

(12) United States Patent
Stone et al.

(10) Patent No.: US 6,625,866 B2
(45) Date of Patent: Sep. 30, 2003

(54) DETERMINANT PASSIVELY-LOCATED POGO MACHINE

(75) Inventors: Paul R. Stone, Federal Way, WA (US); David E. Strand, Newcastle, WA (US); Paul E. Nelson, University Place, WA (US)

(73) Assignee: The Boeing Company, Chicago, IL (US)

( * ) Notice: Subject to any disclaimer, the term of this patent is extended or adjusted under 35 U.S.C. 154(b) by 123 days.

(21) Appl. No.: 09/757,680

(22) Filed: Jan. 9, 2001

(65) Prior Publication Data

US 2001/0024603 A1 Sep. 27, 2001

(51) Int. Cl.$^7$ ................................................ B23P 11/00
(52) U.S. Cl. ...................... 29/559; 29/281.3; 29/281.5; 29/464; 269/21; 269/266
(58) Field of Search .................................. 409/131–132, 409/133, 186–188, 193–195, 219, 225, 218, 220, 227; 408/1 R, 2, 13; 700/193, 195, 175, 173, 176; 269/21, 266, 296, 71; 29/559, 281.3, 281.5, 464

(56) References Cited

U.S. PATENT DOCUMENTS

| | | | | |
|---|---|---|---|---|
| 3,917,930 A | * | 11/1975 | Davey et al. ............... 700/193 |
| 4,088,312 A | * | 5/1978 | Frosch et al. .................. 269/21 |
| 4,382,215 A | * | 5/1983 | Barlow et al. ............... 700/195 |
| 4,821,408 A | * | 4/1989 | Speller et al. ................. 29/701 |
| 4,861,132 A | | 8/1989 | Moulin |
| 4,995,146 A | * | 2/1991 | Woods ....................... 29/281.3 |
| 5,168,453 A | | 12/1992 | Nomaru et al. |
| 5,249,785 A | * | 10/1993 | Nelson et al. .................. 269/21 |
| 5,364,083 A | * | 11/1994 | Ross et al. ..................... 269/21 |
| 5,387,061 A | * | 2/1995 | Barkman et al. ............ 700/175 |
| 5,457,868 A | * | 10/1995 | Blaimschein ................. 29/559 |
| 5,560,102 A | * | 10/1996 | Micale et al. ............... 409/131 |
| 5,615,483 A | * | 4/1997 | Micale et al. .............. 29/897.2 |
| 5,653,005 A | | 8/1997 | Speller, Sr. |
| 6,003,812 A | * | 12/1999 | Micale et al. ........... 244/117 R |
| 6,029,352 A | * | 2/2000 | Nelson ....................... 29/897.2 |
| 6,170,157 B1 | * | 1/2001 | Munk et al. ................ 29/897.2 |
| 6,195,595 B1 | * | 2/2001 | Massee ........................ 700/175 |
| 6,314,630 B1 | * | 11/2001 | Munk et al. .............. 29/407.01 |
| 6,418,602 B2 | * | 7/2002 | Crocker et al. ............. 29/281.4 |
| 2002/0092149 A1 | * | 7/2002 | Wolf et al. .................... 29/464 |

FOREIGN PATENT DOCUMENTS

EP          1139189 A2  * 10/2001
WO       WO-97/34733 A1 * 9/1997

* cited by examiner

Primary Examiner—A. L. Wellington
Assistant Examiner—Erica E Cadugan
(74) Attorney, Agent, or Firm—J. Michael Neary

(57) ABSTRACT

A method and apparatus for manufacturing large, semi-flexible metal components includes a fixture that holds the component blank in a desired position for manufacturing operations by accurate numerically controlled machine tools using original numerical part definition records, utilizing spatial relationships between key features of detail parts or subassemblies as represented by coordination features machined into the parts and subassemblies, thereby making the parts and subassemblies intrinsically determinant of the dimensions and contour of the part.

5 Claims, 26 Drawing Sheets

DETERMINANT PASSIVELY-LOCATED POGO MACHINE

REFERENCE TO OTHER APPLICATIONS

This is related to U.S. patent application Ser. No. 09/155,236 entitled "Determinant Spar Assembly" and filed on Sep. 21, 1998, issued as U.S. Pat. No. 6,170,157, which was based on PCT Application No. US97/04453 filed on Mar. 21, 1997 and U.S. Provisional Application No. 60/013,986 filed on Mar. 22, 1996.

TECHNICAL FIELD

This invention relates to a method and apparatus for assembling wing spars and ribs to close tolerances, and more particularly, to a method and apparatus for assembling wing spars and ribs with extreme and unprecedented precision to produce wing components having extremely close conformance to the original engineering design, with significantly reduced tooling expense.

BACKGROUND OF THE INVENTION

Conventional manufacturing techniques for assembling airplane wing spars and ribs to a specified contour rely on fixtured "hardpoint" tooling techniques utilizing floor assembly jigs and templates to locate and temporarily fasten detailed structural parts together to locate the parts correctly relative to one another. This traditional tooling concept usually requires primary assembly tools for each subassembly produced, and two large spar assembly tools (left and right) in which the subassemblies are assembled into an assembled spar.

Spar assembly tooling is intended to accurately reflect the original engineering design of the product, but using the conventional tooling concept in which the tooling sets the configuration of the final assembly, there are many steps between the original design of the product and the final manufacture of the tool. It is not unusual that the tool as finally manufactured produces missized spars or wing components that would be outside of the dimensional tolerances of the original spar or spar component design without extensive, time consuming and costly hand work to correct the tooling-induced errors. More seriously, a tool that was originally built within tolerance can become out of tolerance from the hard use it typically receives in the factory. Moreover, dimensional variations caused by temperature changes in the factory can produce a variation in the final part dimensions as produced on the tool, particularly when a large difference in the coefficient of thermal expansion exists between the tooling and the spar, as in the usual case where the tooling is made of steel and the spar components are made of aluminum. Since dimensions in airplane construction are often controlled to within 0.005", temperature induced dimensional variations can be significant.

Hand drilling of the part on the tool can produce holes that are not perfectly round or normal to the part surface when the drill is presented to the part at an angle that is slightly nonperpendicular to the part, and also when the drill is plunged into the part with a motion that is not perfectly linear. Parts can shift out of their intended position when they are fastened in non-round holes, and the nonuniform hole-to-fastener interference in a non-round hole lacks the strength and fatigue durability of round holes. The tolerance buildup on the spar subassemblies can result in significant growth from the original design dimensions, particularly when the part is located on the tool at one end of the part, forcing all of the part variation in one direction instead of centering it over the true intended position.

Spar components are typically fastened together with high interference fasteners and/or fasteners in cold worked holes. Interference fasteners, such as rivets and lock bolts, and cold working of a fastener hole, both create a pattern of stress in the metal around the hole that improves the fatigue life of the assembled joint, but a long line of such stress patterns causes dimensional growth of the assembly, primarily in the longitudinal direction, and also can cause an elongated part to warp, or "banana" along its length. Attempts to restrain the assembly to prevent such distortion are generally fruitless, so the most successful technique to date has been to attempt to predict the extent of the distortion and account for it in the original design of the parts, with the intent that the assembly will distort to a shape that is approximately what is called for in the design. However, such predictions are only approximations because of the naturally occurring variations in the installation of fasteners and the cold working of holes, so there is often a degree of unpredictability in the configuration of the final assembly. A process for washing out the effects of the distortion in the subassemblies before they are fastened into the final assembly has long been sought and would be of significant value in spar manufacturing, as well as in the manufacture of other parts of the airplane.

Wing major spar tooling is expensive to build and maintain within tolerance, and requires a long lead time to design and build. The enormous cost and long lead time to build wing spar tooling is a profound deterrent to redesigning the wing of an exist model airplane, even when new developments in aerodynamics are made, because the new design would necessitate rebuilding the wing spar tools. One existing system for automatic drilling, fastener installation and tightening is shown in U.S. Pat. No. 5,664,311 by Banks et al. entitled "Automated Spar Assembly Tool". It produces spars accurately, but is a costly system to build and maintain.

The capability of quickly designing and building spars for custom wings for airline customers having particular requirements not met by existing airplane models would give an airframe manufacturer an enormous competitive advantage. Currently, that capability does not exist because the cost of the dedicated wing and wing spar tooling and the factory floor space that such tooling would require make the cost of "designer wings" prohibitively expensive. However, if the same tooling that is used to make the standard wing spar for a particular model could be quickly and easily converted to building spars for custom wings that meet the particular requirements of a customer, and then converted back to the standard model or another custom wing design, airplanes could be offered to customers with wings optimized specifically to meet their specific requirements. The only incremental cost of the new wing would be the engineering and possibly some modest machining of headers and other low cost tooling that would be unique to that wing design The disadvantages of manufacturing processes using hard tooling are inherent. Although these disadvantages can be minimized by rigorous quality control techniques, they will always be present to some extent in the manufacture of large mechanical structures using hard tooling.

A determinant assembly process has been developed for airplane fuselage manufacture, replacing hardpoint tooling with self-locating detail parts that determine the configuration of the assembly by their own dimensions and certain coordinating features incorporated into the design of the parts. This new process, shown in U.S. Pat. No. 5,560,102 entitled "Panel and Fuselage Assembly" by Micale and Strand, has proven to produce far more accurate assemblies with much less rework. Application of the determinant assembly process in airplane wing spar manufacture has been shown to yield a better process that eliminates or minimizes the use of hard tooling while increasing both the production capacity of the factory and increasing the quality of the product by reducing part variability while reducing the costs of production and providing flexibility in making fast design changes available to its customers. These improvements are proving to be a great boon to the airframe manufacturer where it was originated and will improve the competitive position of the manufacturer in the marketplace. Such an improvement is shown in U.S. Pat. No. 6,170,157 entitled Determinant Spar Assembly issued on Jan. 9, 2001 to Clayton Munk, Paul Nelson and David Strand and assigned to The Boeing Company.

Although the apparatus shown in U.S. Pat. No. 6,170,157 is an excellent improvement over the previous state of the art in assembly machines, it is such a radical departure from the state-of-the-art that many improvements could be made that would improve its functionality and efficiency. For example, the process for setting the position of the pogos on the machine, while perfectly adequate, could be improved to itself be determinately set and possibly semi-automated. Moreover, the potential uses to which such an apparatus could be applied are much broader than the assembly of airplane wing spars. The present invention is a significant step toward such improved processes and applications.

SUMMARY OF THE INVENTION

Accordingly, this invention provides a method of manufacturing long, large and heavy assemblies such as airplane wing spars and ribs from flexible and semi-flexible parts and subassemblies in accordance with an original engineering design instead of the tooling by using a CNC machine tool to set the position the part holding devices according to the original engineering design.

The invention also provides a method of manufacturing airplane wing spars, wing ribs and other such parts made of long flexible or semi-flexible elements using a CNC machine tool by hanging one or more of those elements from locating pins and vacuum cups whose positions in space are set by that same machine tool.

The invention provides a system for positioning part positioning and attachment devices in space at a desirable position to hold parts of a particular contour, curved or flat, such as airplane wing panels and wing spars that is faster, more accurate, more flexible, and less expensive than the prior art traditional techniques and requires less factory space and is less dependent upon the skill of workers to produce parts within the engineering tolerances specified.

The invention includes a system for holding large flexible or semi-flexible parts on a fixture while performing manufacturing operations such as probing clamping, drilling, inserting fasteners and securing the fastener to produce a final product such as an airplane wing panel or wing spar. The fixture has a series of pogos, each having a part holding device such as a vacuum head, that is positionable in space at a desired position corresponding to point on the contour of the part which is to be engaged by the part holding device. For a planar part such as a wing spar, the part holding devices on the ends of the pogos are positioned in a vertical plane and locked in position for holding the parts on which a machine tool such as a post mill performs manufacturing operations to advance the part to the next step in the assembly of an airplane or other finished product.

Positioning of the part holding devices on the ends of the pogos is achieved by capturing the part holding device with the same machine tool that will perform the manufacturing operations on the part, and physically moving the part holding device to the desired location. The pogo-mounting structure is supported on rollers and the like that enable it to move freely when the machine tool captures and moves the part holding device, and can then be locked in position when the part holding device is at the desired location in space.

DESCRIPTION OF THE DRAWINGS

The invention and its many attendant objects and advantages will become better understood upon reading the following detailed description of the preferred embodiment in conjunction with the following drawings, wherein.

DESCRIPTION OF THE PREFERRED EMBODIMENT

Figure 1:
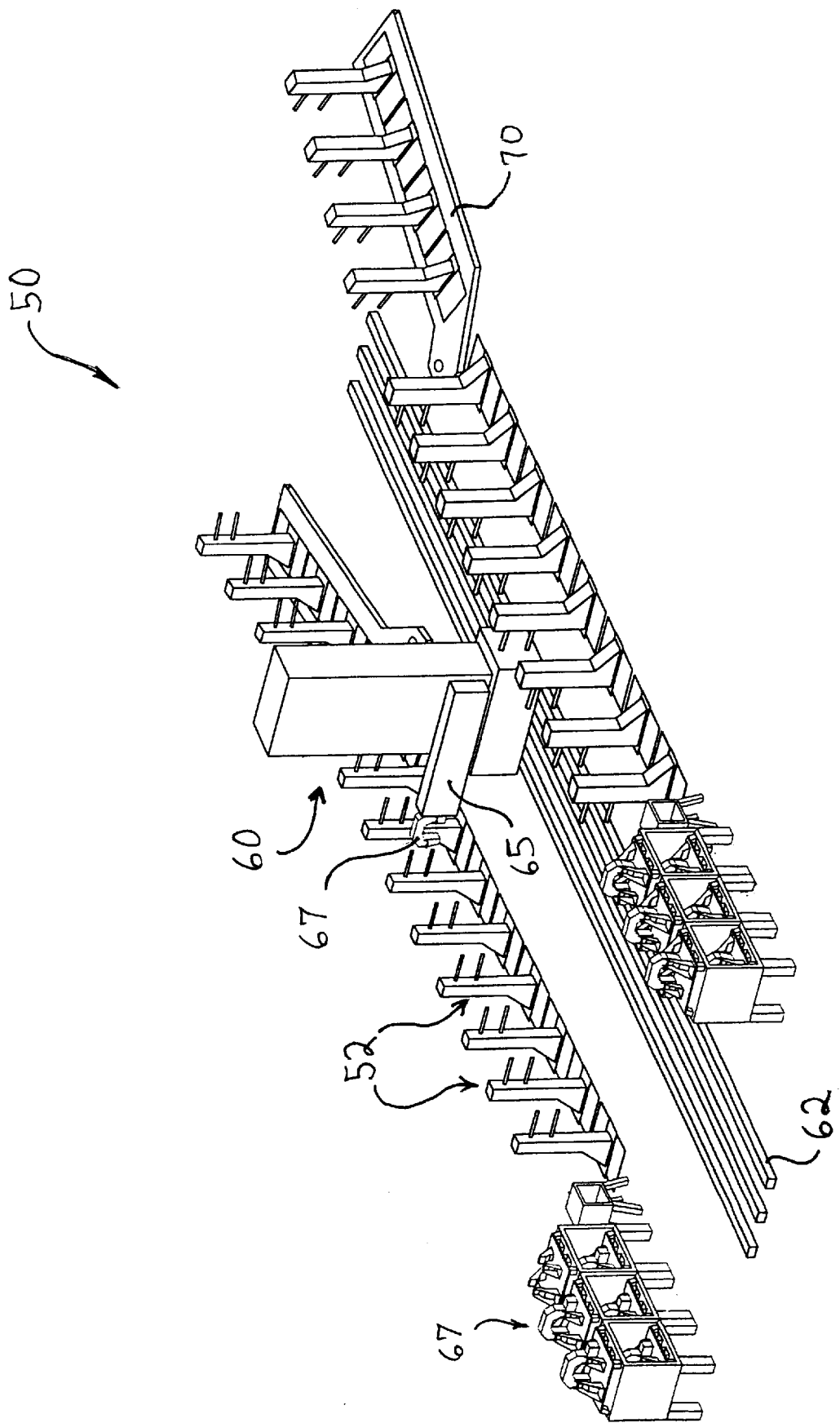
FIG. 1 is a perspective schematic view of a wing spar assembly cell in accordance with this invention.
Figure 2:
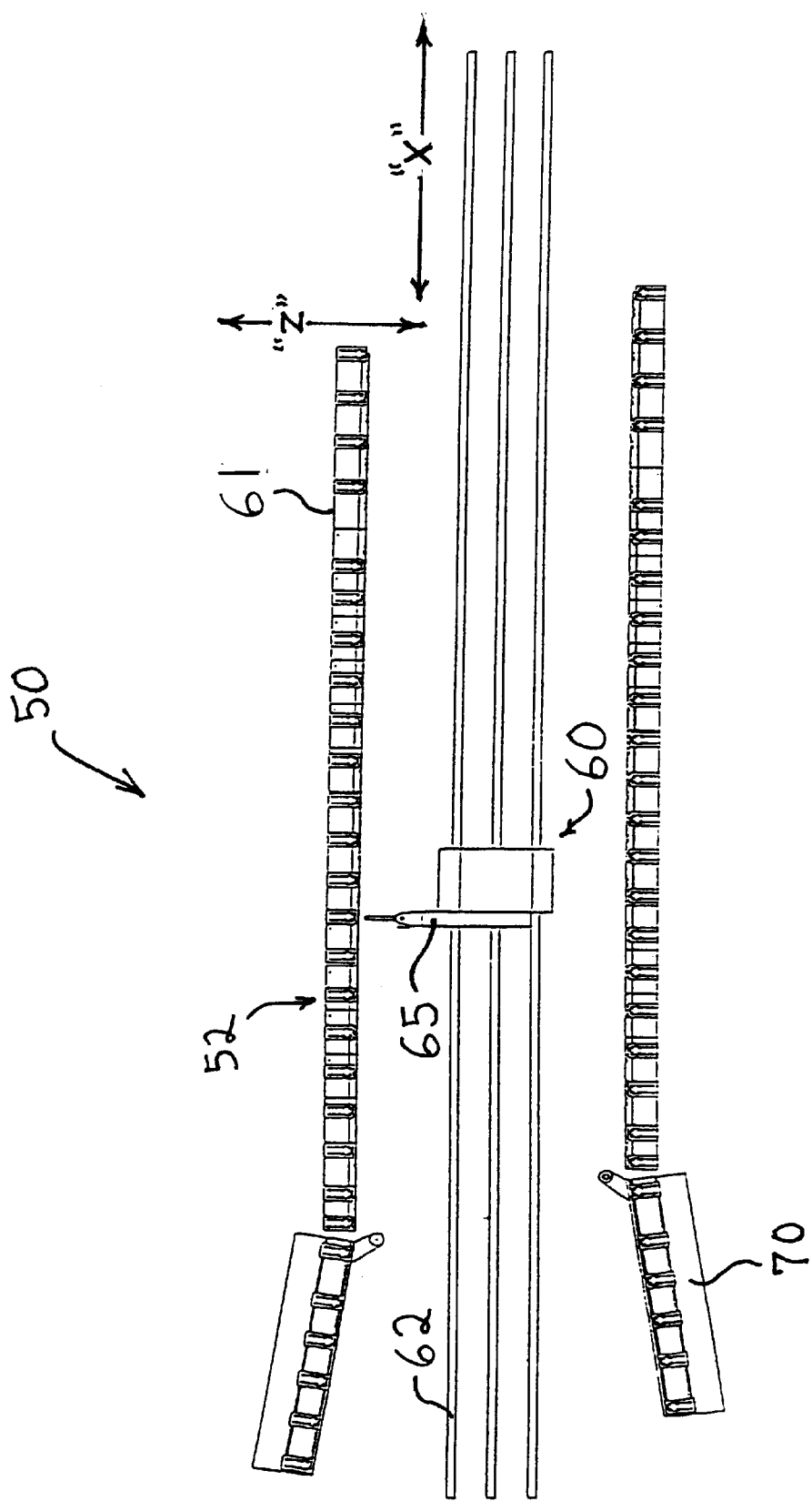
FIG. 2 is a plan view of the assembly cell shown in FIG. 1.
Figure 6:
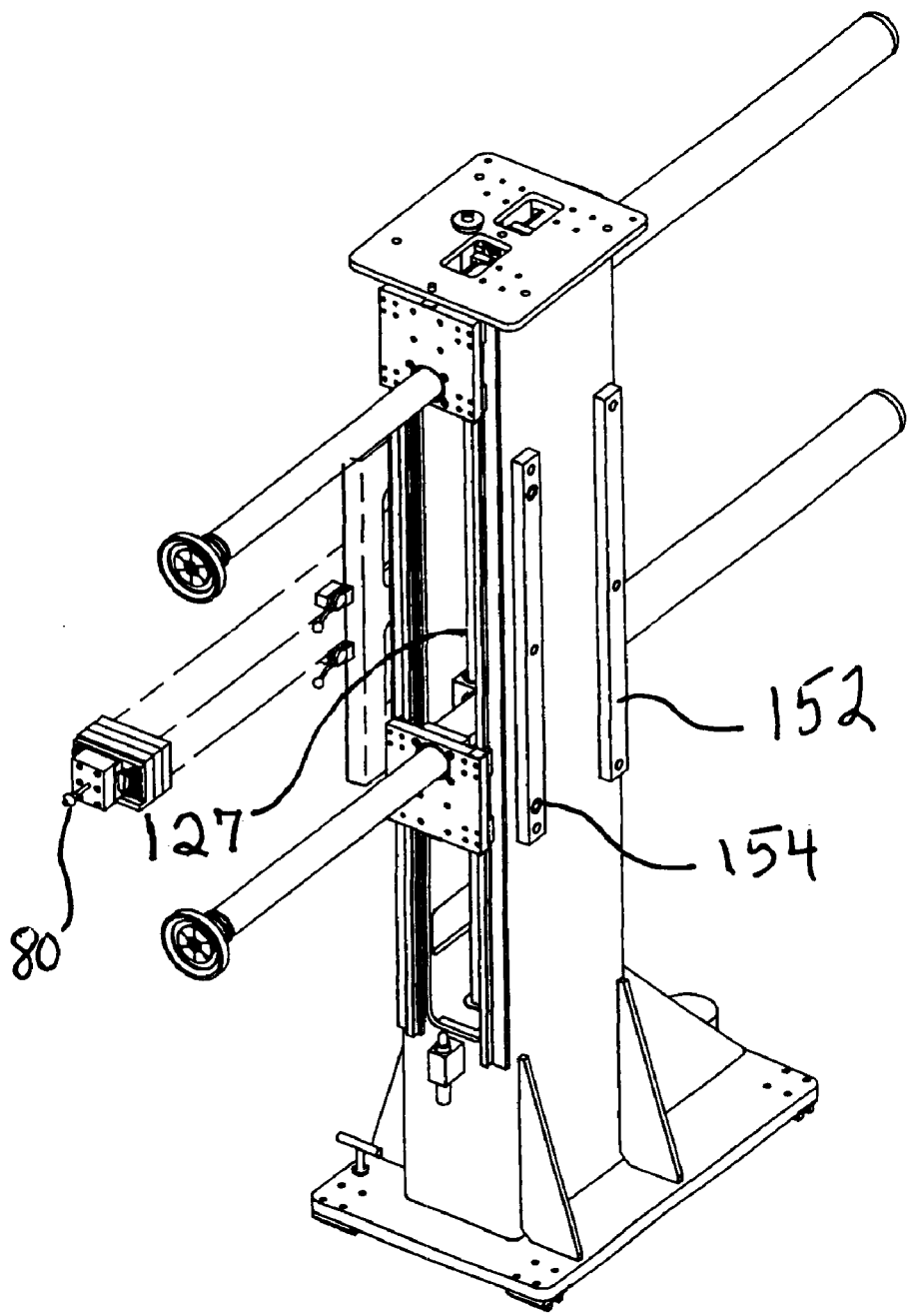
FIG. 6 is a perspective view of one of the towers
Figure 7:
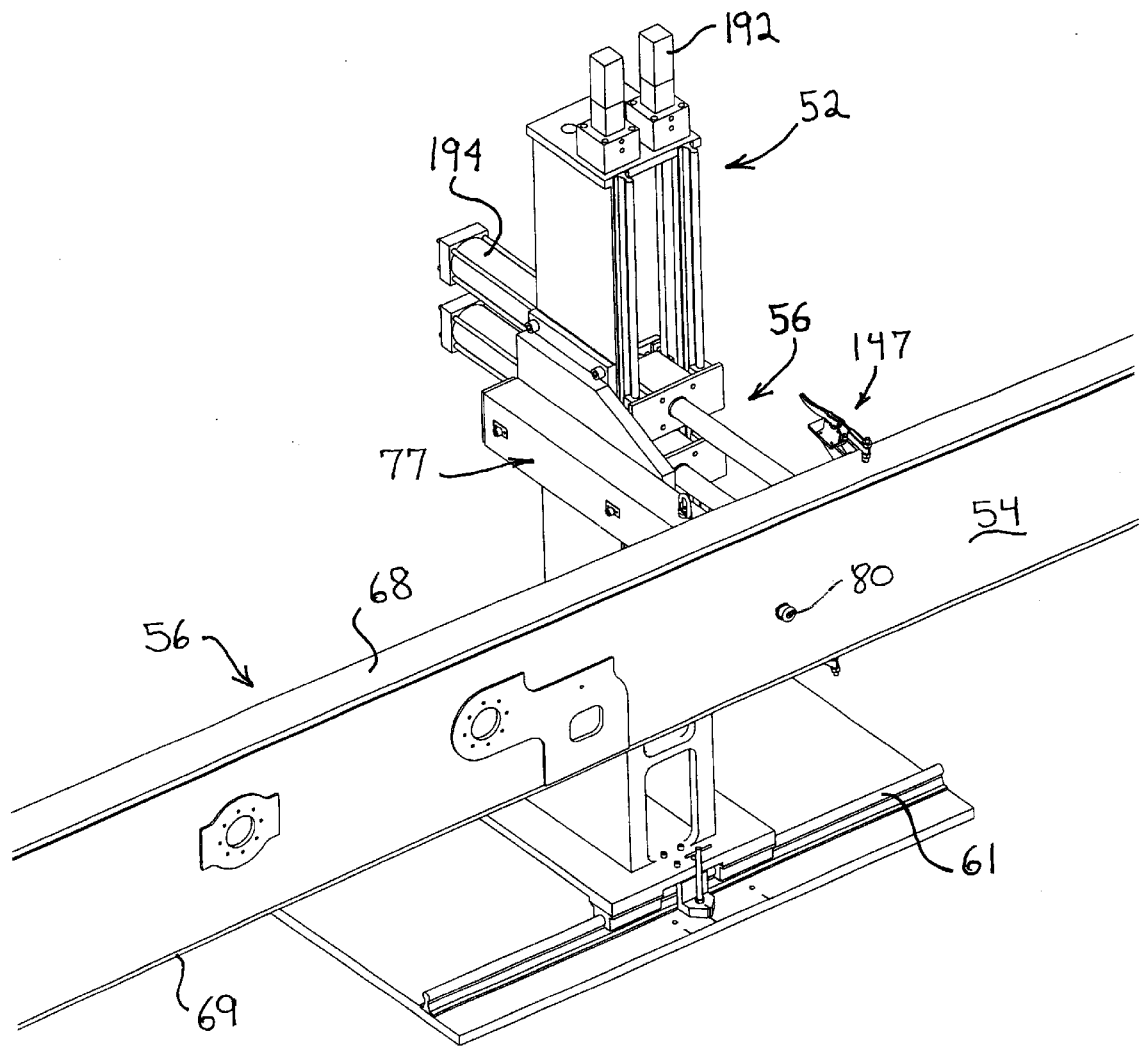
FIG. 7 is a perspective view of an active pogo setting tower showing the index arm supporting the spar and showing clamps of temporary chord locators.

Referring now to the drawings, wherein like reference characters designate identical or corresponding parts, and more particularly to FIGS. 1–6 thereof, an apparatus 50 in accordance with this invention is shown having an array of towers 52 for holding elements of a part, such as a web 54 of an airplane wing spar 56, as shown in FIG. 7, in position for assembly operations performed by a machine tool, such as a post mill 60. The towers 52 are mounted on rails 61 for longitudinal adjustment therealong in the "X" direction, as shown in FIG. 2, by the post mill 60, and the post mill 60 itself is mounted on rails 62 for longitudinal movement. The post mill 60 has an arm 65 that is movable vertically in the "Y" direction and also laterally in the "Z" direction. The arm 65 has a conventional gripper with receptacles for power, data transmission, and air pressure, as is known in the art, for engaging and gripping any of several end effectors 67 held in a rack adjacent to the array of towers 52. The post mill 60 can be directed by a machine tool controller (not shown) to change end effectors 67 when it has completed one set of operations and is ready to begin another set of operations requiring a different tool.

A predecessor process for assembling a wing spar, as performed on an earlier version of the apparatus shown in FIG. 1, is described in detain in U.S. Pat. No. 6,170,157. That description is incorporated herein by reference. It teaches a process of positioning top and bottom chords 68 and 69 along the top and bottom edges of the spar web 54 where they are adhered and sealed, and then fastened thereto with numerous fasteners such as rivets, bolts, lock bolts, Hi-Locks, and the like, which are widely used in the aerospace industry, and are well understood and reliable.

A bend or "kink" is found on most wing spars so that the spars can conform to the designed position of the front and rear outside edges of the wing box. The apparatus shown in FIG. 1 accomodates the Kink by an adjustable table 70 that can pivot to the desired kink angle and support the spar web 54 at that kink angle. The table 70 carries several towers 52, also mounted on rails 61 for longitudinal adjustment therealong.

A spar assembly process in accordance with this invention for assembling an airplane wing spar begins with configuring the assembly cell 50, shown in FIGS. 1 and 2, for the particular size and design of the wing spar to be assembled in the cell 50. Using a process described in detail below, the towers 52 are moved on their rails 61 in the "X" direction parallel to the plane of the spar web 54 to position them at the desired position lengthwise of the spar. Part holding devices, such as vacuum heads 72 are attached to the front ends of "pogo" tubes 73 that are adjustable in the "Z" direction in the body 74 of pogo assemblies 75, as illustrated in FIGS. 8–12. The structure and operation of the pogos 75 is described further below. One or more pogos 75 are mounted on each of the towers 52 for holding the spar web 54 at precisely the desired lateral position, in the "Z" direction in the cell 50. The vacuum heads are described in detail in U.S. patent application Ser. No. 09/669,322 filed on Sep. 25, 2000 by the same inventors as this application and entitled "Vacuum Head with Precision Hard Stop".

Figure 3:
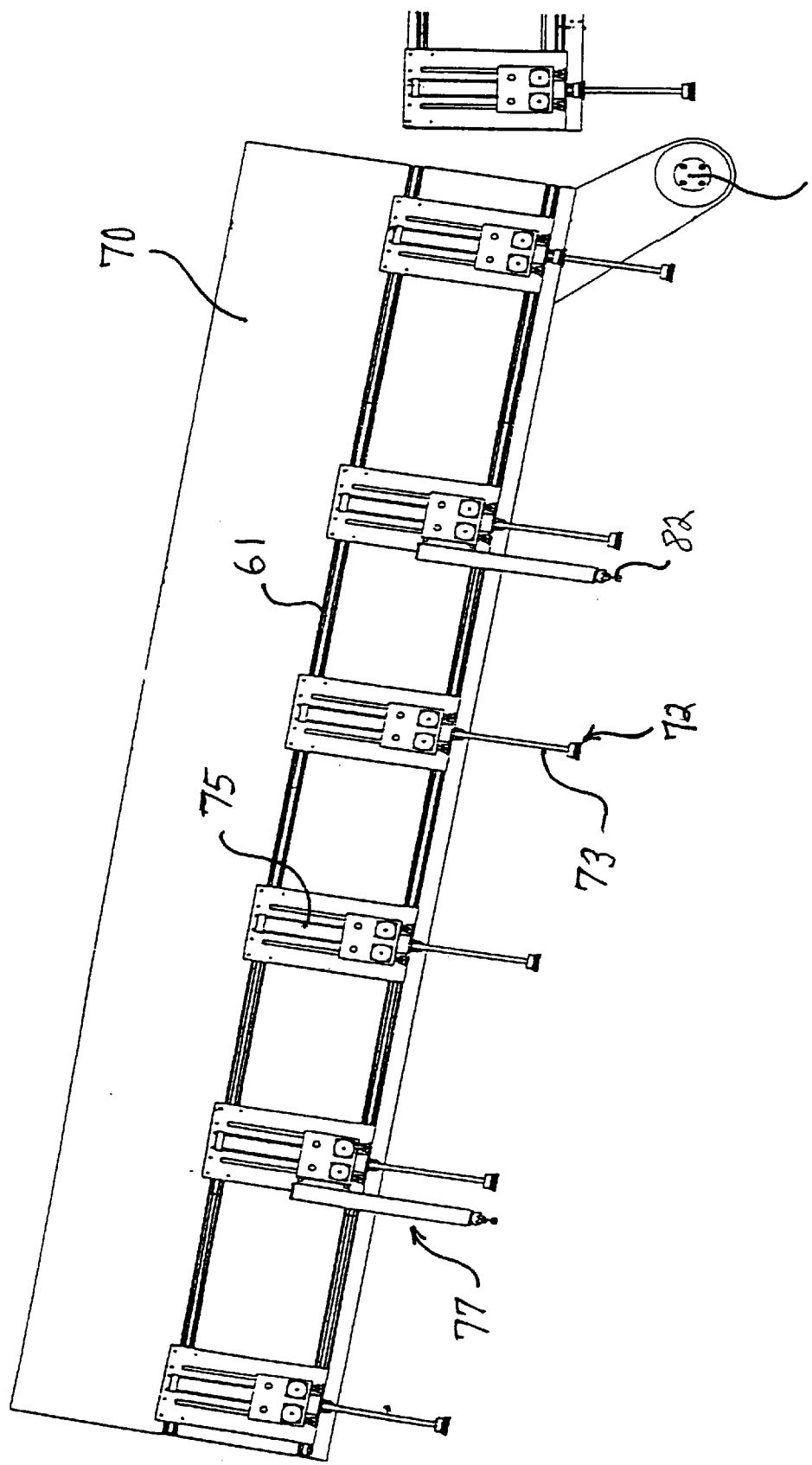
FIG. 3 is a plan view of one side of the assembly cell shown in FIG. 1, in the region of the kink, showing active pogo setting.
Figure 4:
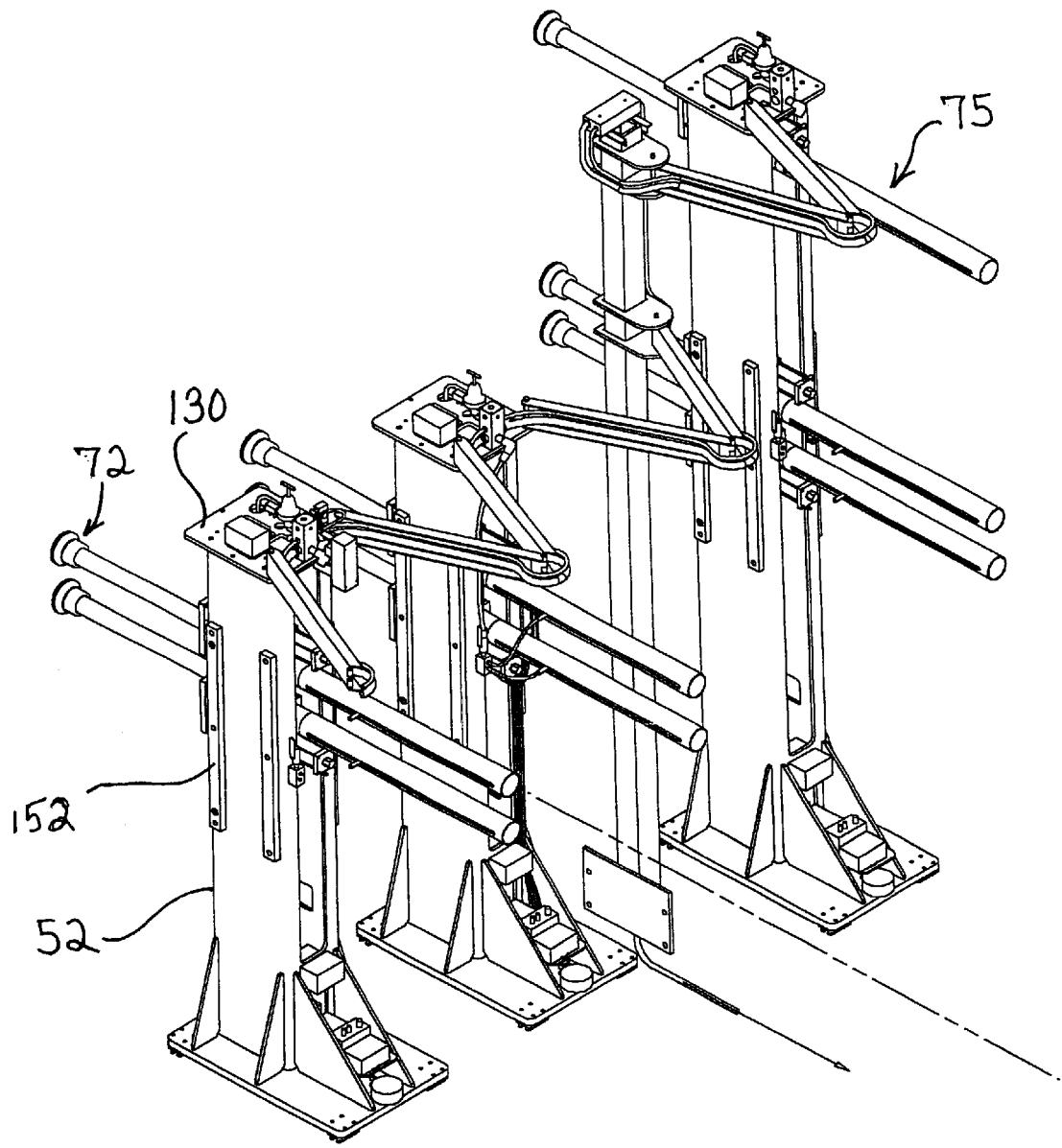
FIG. 4 is a perspective view of three towers adjacent the pivot, of the passive pogo setting type, and showing the festoon for carrying air pressure lines and data cables.
Figure 5:
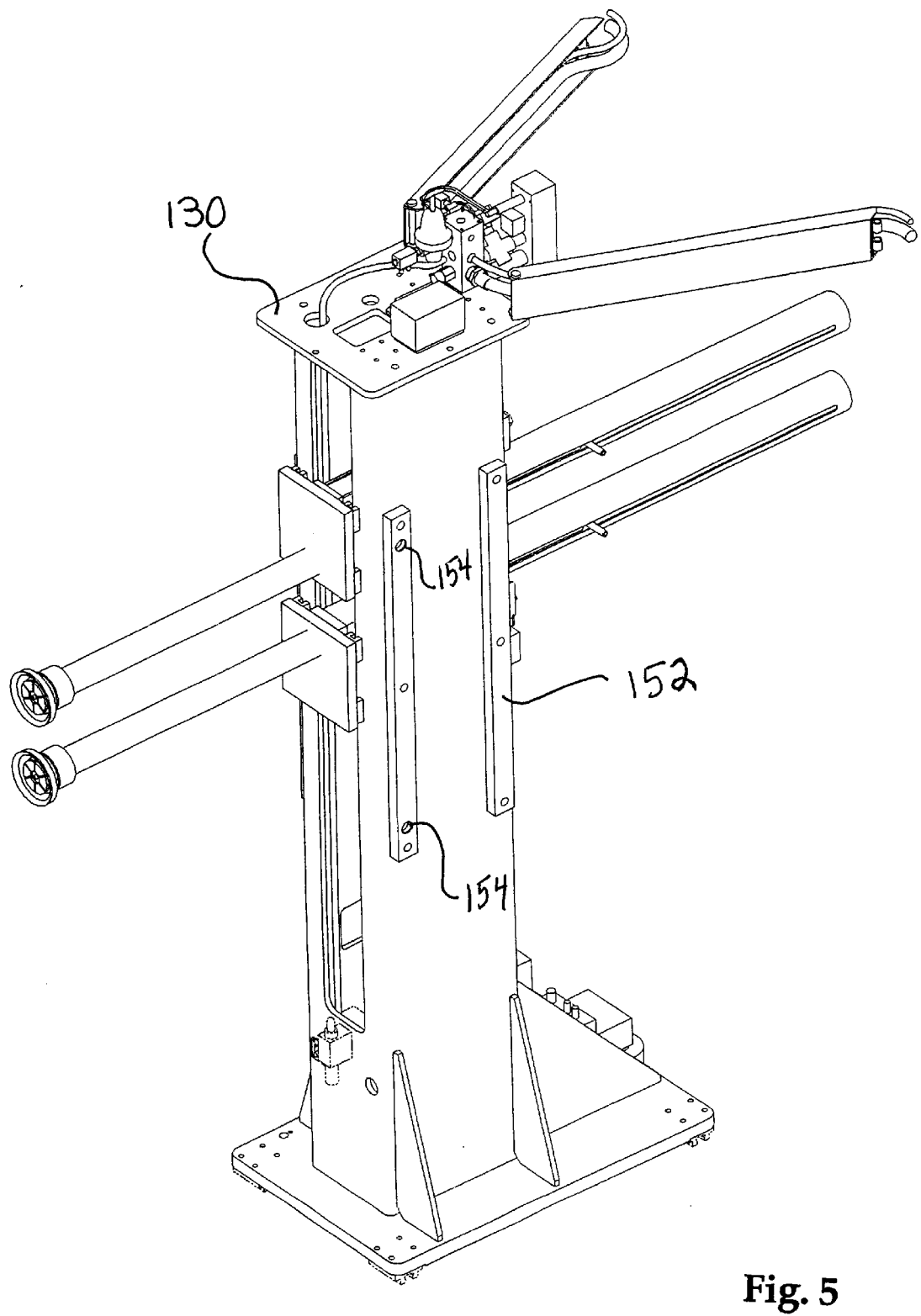
FIG. 5 is an enlarged perspective view of a passive pogo setting type tower having two pogos and an index arm.
Figure 8:
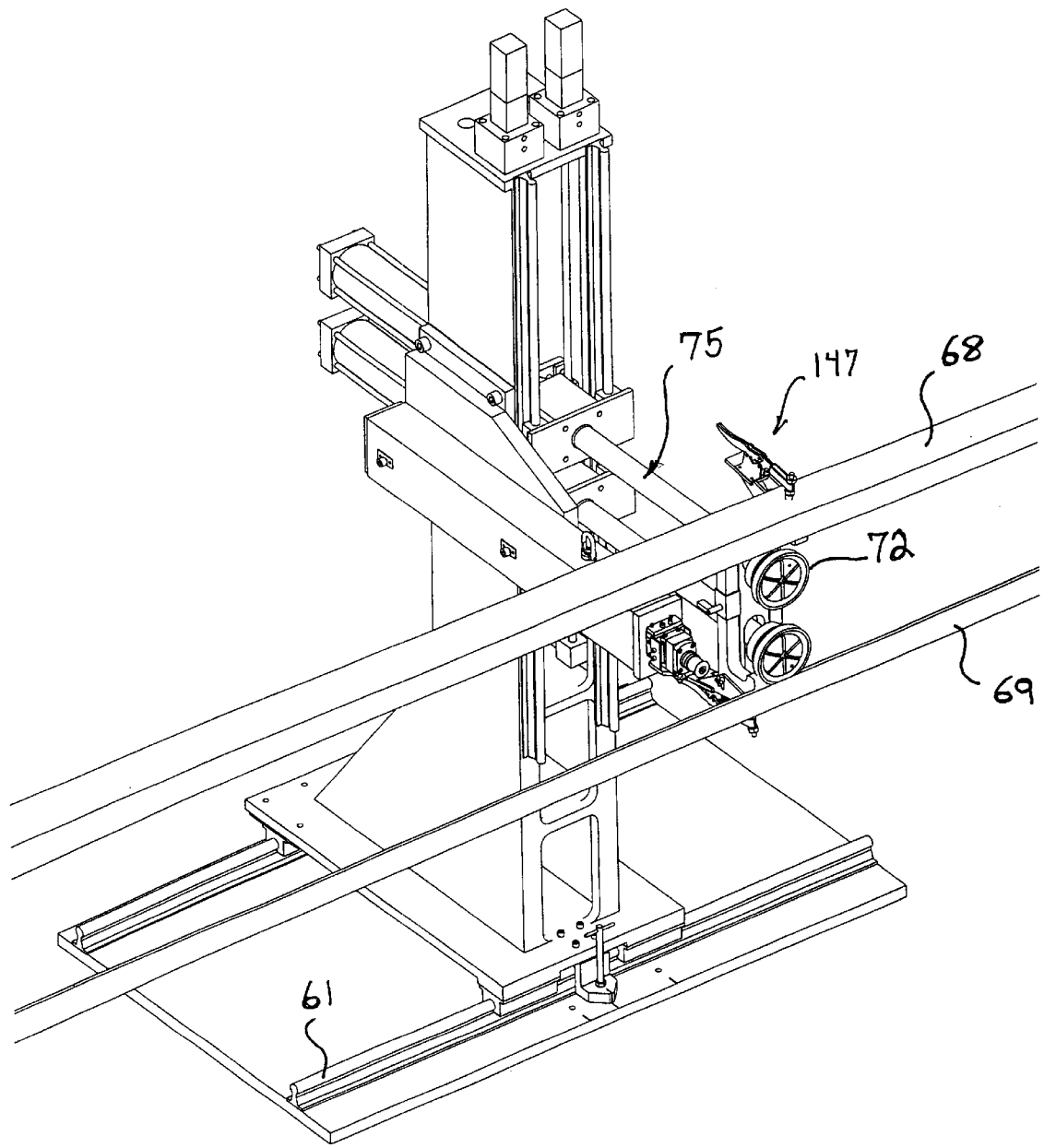
FIG. 8 a perspective view of an active pogo setting tower with the spar web removed to show the index arm supporting and the vacuum heads.
Figure 9:
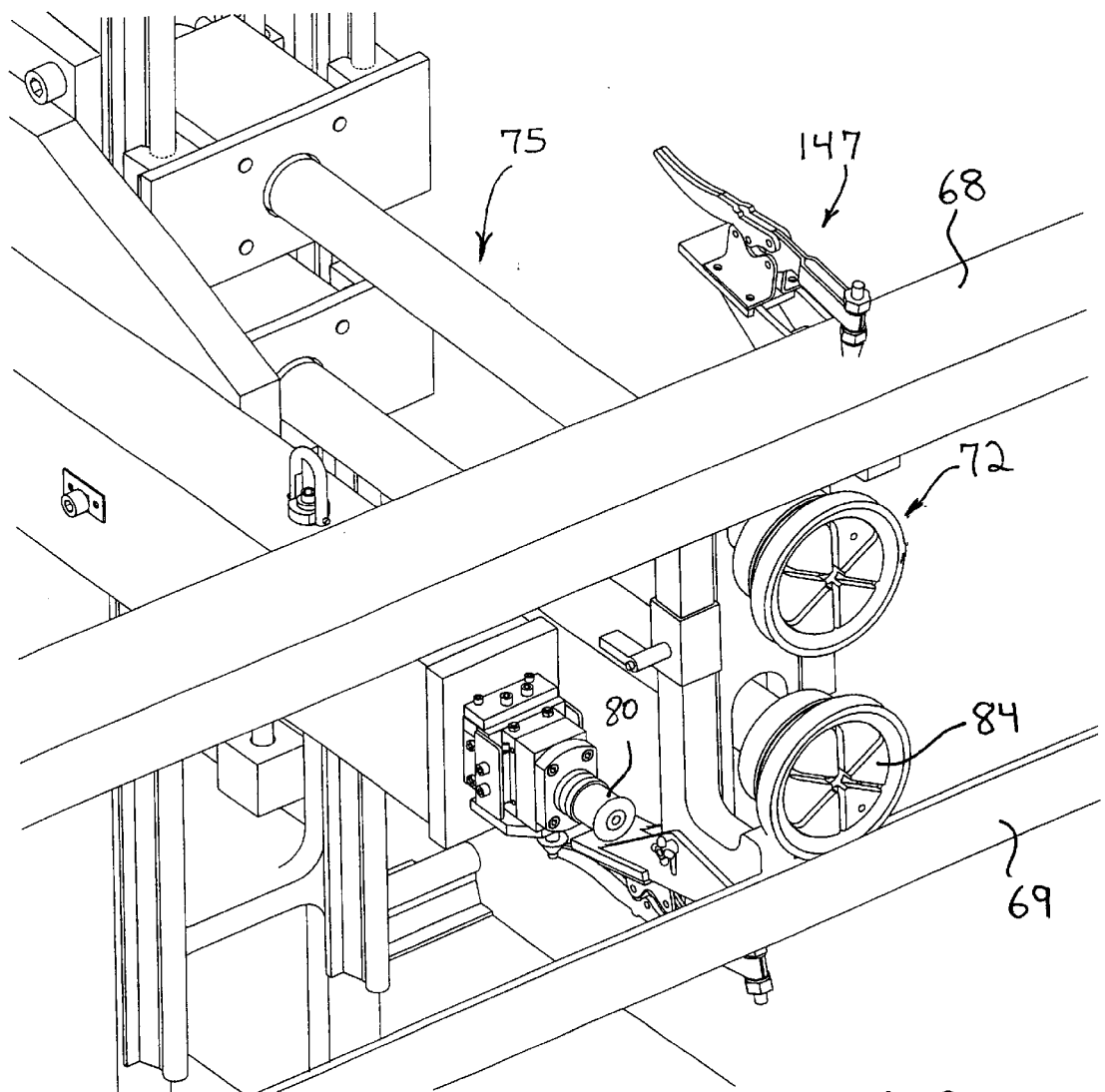
FIG. 9 is an enlarged view of a portion of FIG. 8.
Figure 10:
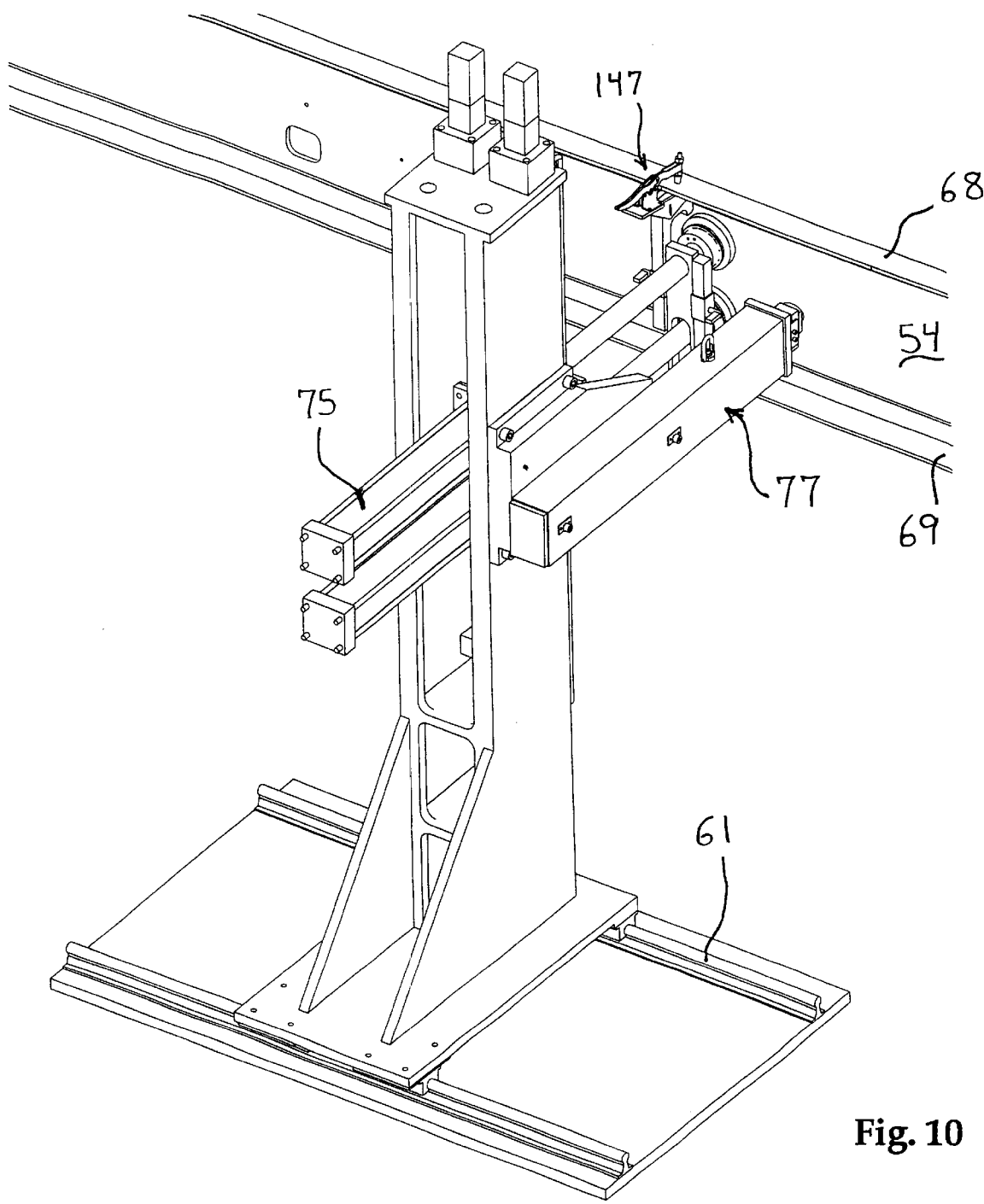
FIG. 10 is a perspective view of the back right side of the structure shown in FIG. 7.
Figure 11:
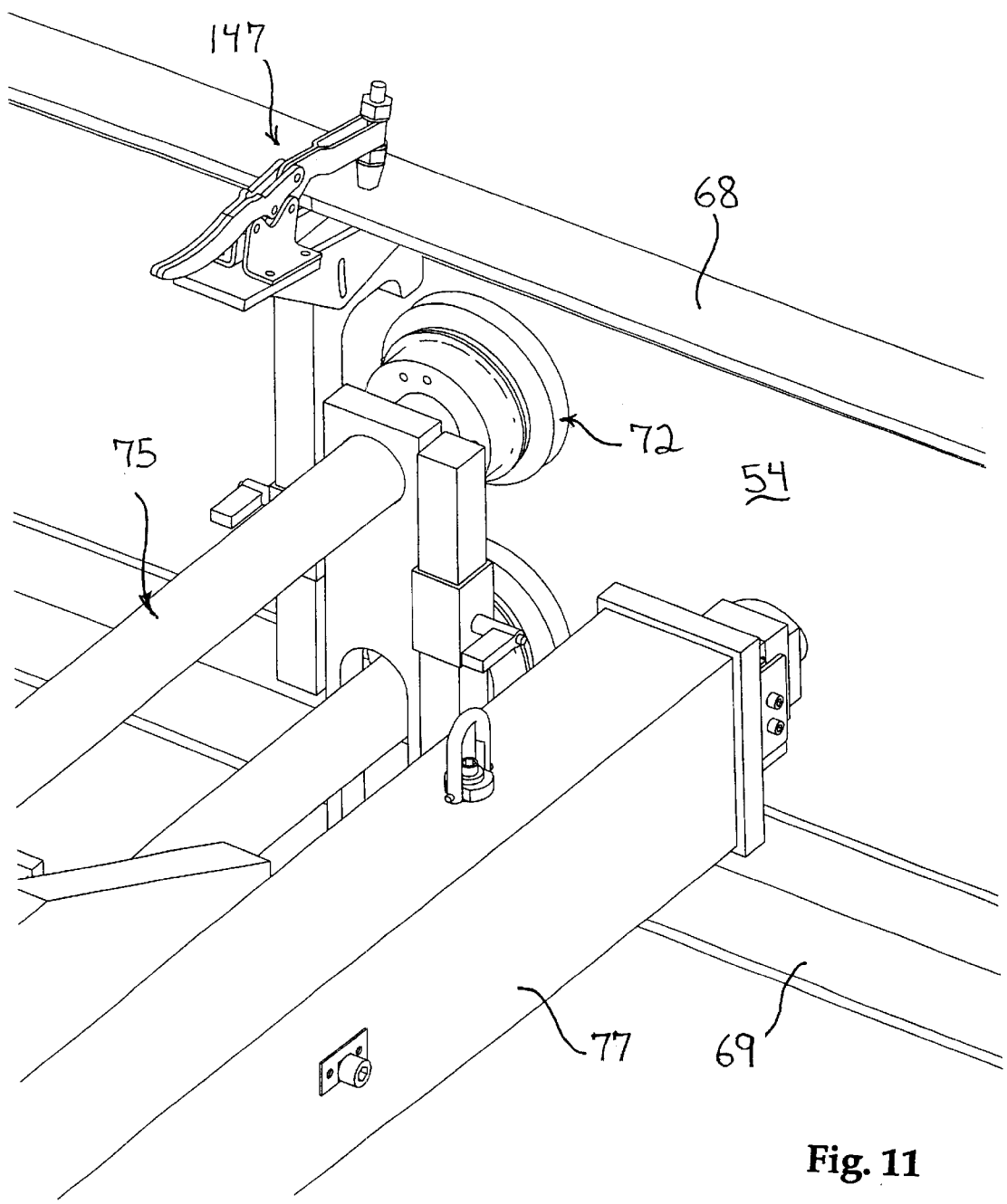
FIG. 11 is an enlarged perspective view of a portion of FIG. 10.
Figure 12:
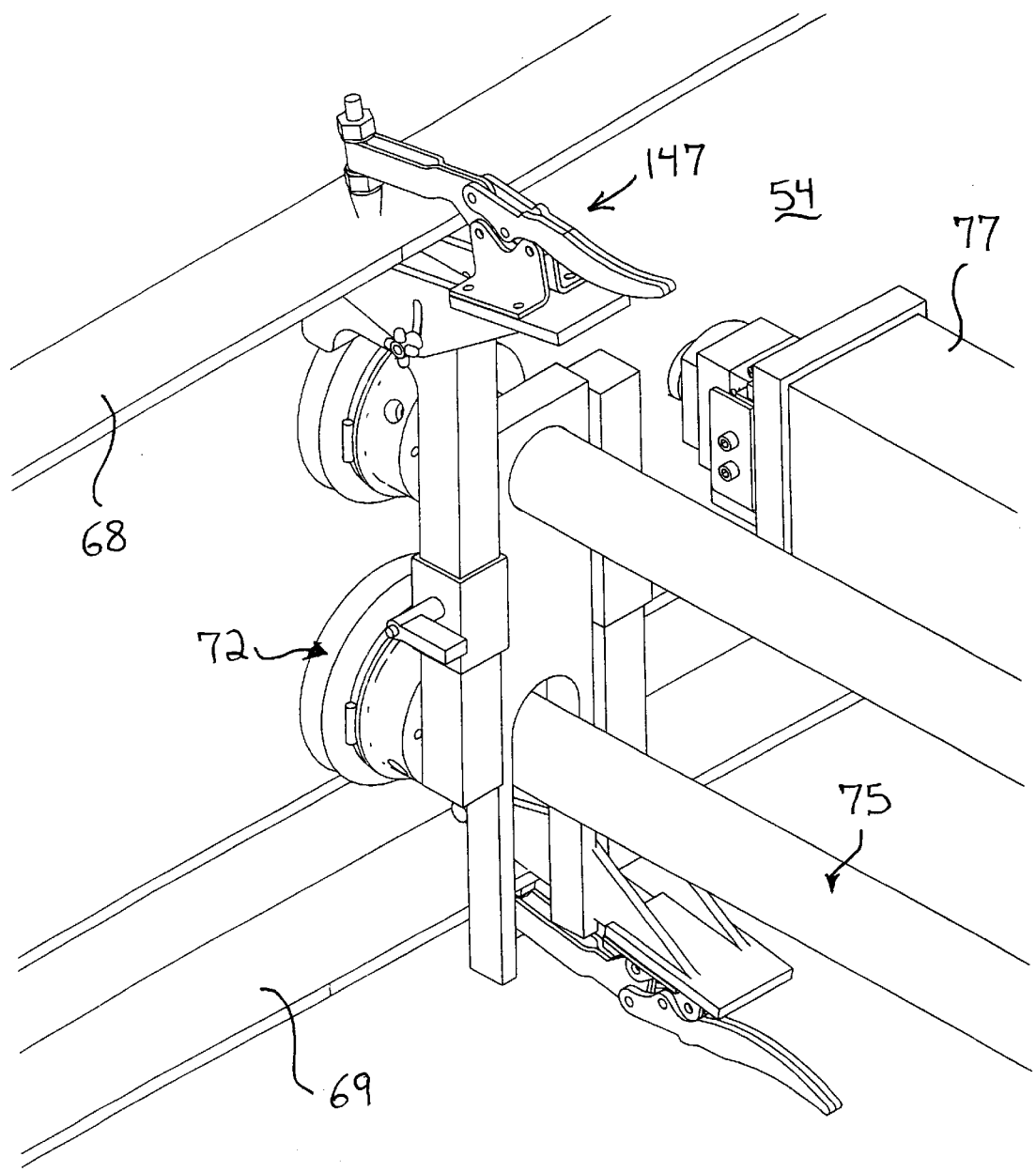
FIG. 12 is an enlarged perspective view of the back left side of the structure shown in FIG. 11.
Figure 13:
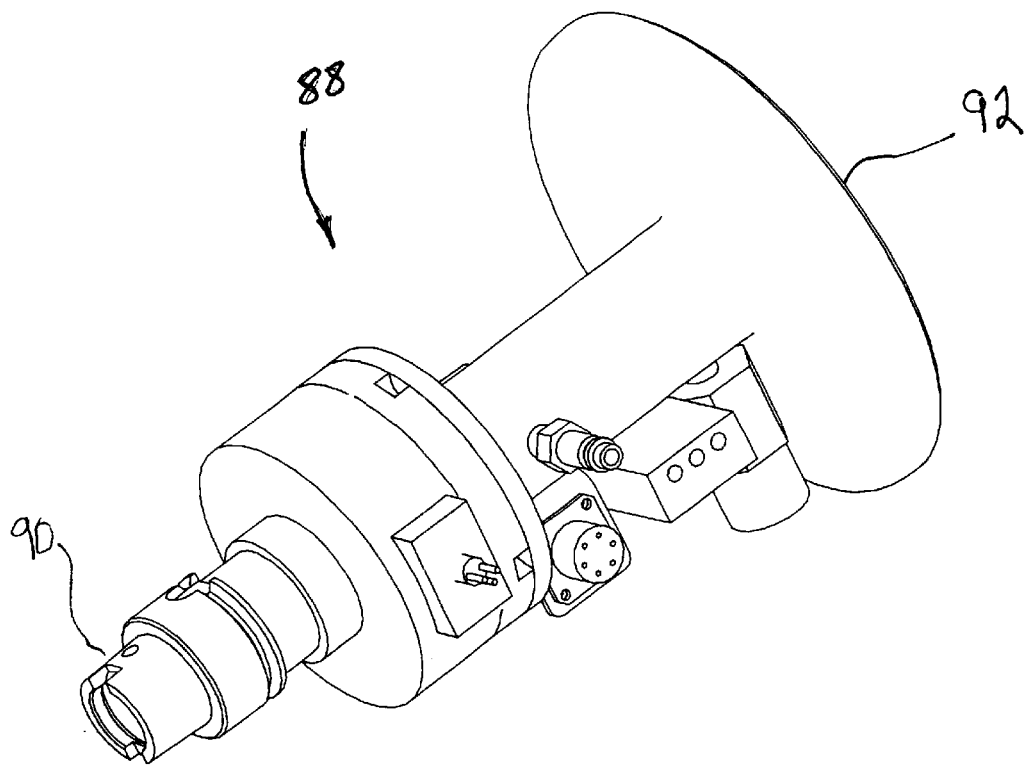
FIGS. 13 and 14 are perspective views of the pogo setting tool, viewed from the side of the connector to the post mill.
Figure 14:
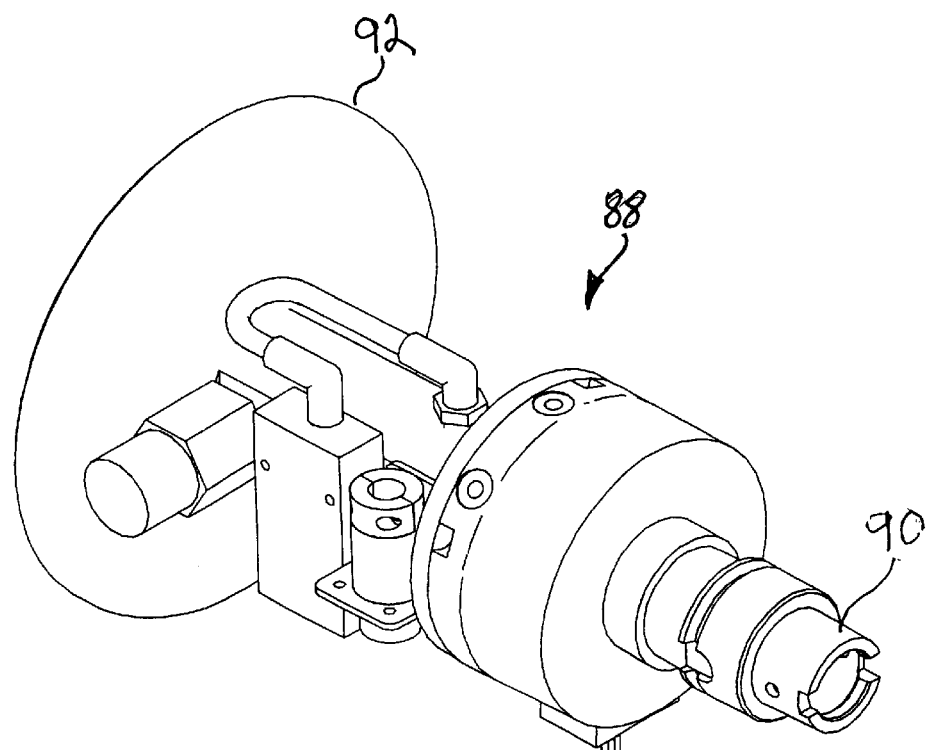
Figure 16:
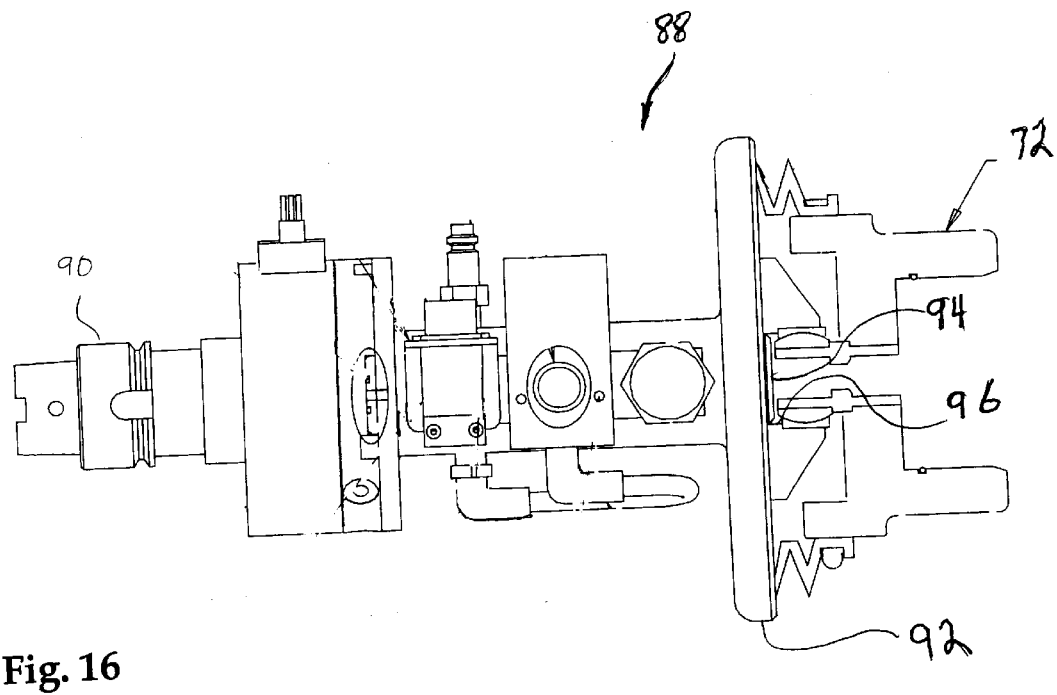
FIGS. 15 and 16 are top plan and side elevation views of the pogo setting tool shown in FIGS. 13 and 14 is a view like FIG. 14, but showing the spar web removed for purposes of illustration.
Figure 15:
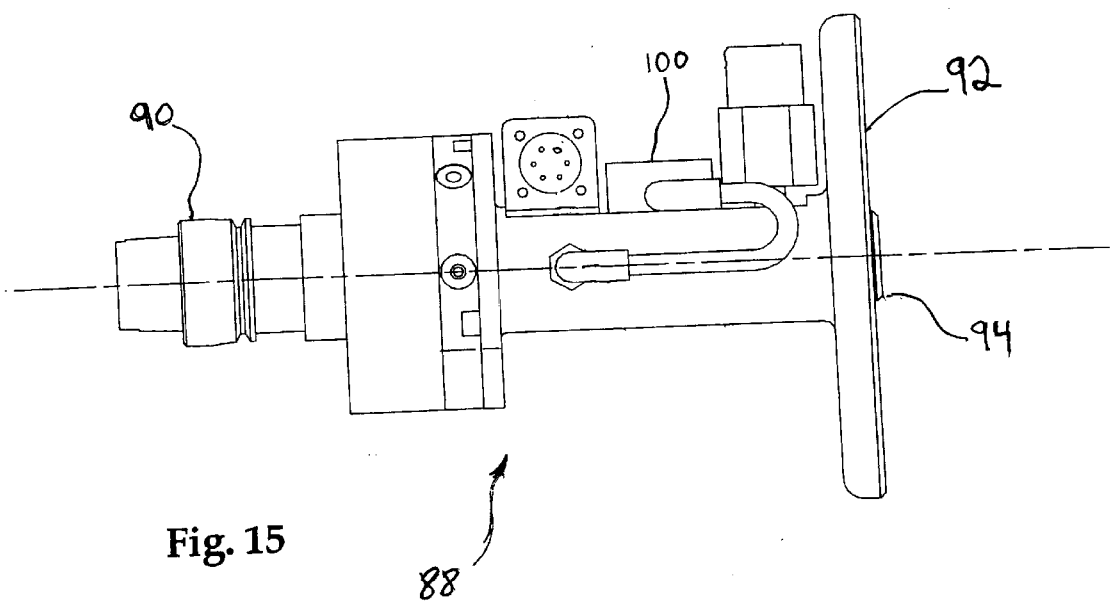

An index arm 77 is attached to selected ones of the towers 52, as shown in FIGS. 3, 6 and 8, to carry the weight of the spar web 54 and fix the position of the web 54 at a precisely known position in space for operations by the post mill 60. A primary index pin 80 attached to the distal end of one of the index arms 77 is received in a coordination hole pre-drilled in the spar web 54 to position the web accurately in space in the "X" and "Y" directions, in an orientation that is longitudinally horizontal and laterally upright, as shown in FIG. 7. Secondary index pins 82 on other index arms 77 are also engaged in coordination holes, also predrilled in the web 45, to support the web vertically. The secondary index pins 82 are horizontally compliant, as described in detail below, to accommodate longitudinal growth in the spar web 45 caused by fastener installation. Vacuum delivered via vacuum lines 83 to the vacuum heads 72 on the ends of the pogo tubes 73 draw the web 54 against a hard-stop surface 84 within the vacuum heads 72 to hold the web in the lateral "Z" position established by the extension of the pogo tubes 73.

The body of the post mill 60 can be provided with the capability to rotate about its vertical axis if, as described herein, the cell 50 has a line of towers 52 on both sides of the cell, so the post mill can be performing operations on one side while workers are installing parts, removing completed spars or doing other manual operations on the other side. The arm 65 of the post mill 60 has a wrist that can rotate about the axis of the arm 65 and can also be provided with sideways tilt capability to provide additional axes of movement for the end effectors 67 used to perform the various functions needed in the assembly cell 50. These axes of motion permit the post mill 60 to position the end effectors in any desired position and orientation within the reach of the arm 65.

The post mill 60 shown is supplied by Ingersol Milling Machine Company, but other machine tools, such as a Henri Line gantry mounted 5-axis tool, or an "Aeroflex" six-axis positioner made by Pegard Products, Inc. in Machesney Park, Ill. could be used. The required capabilities are precision, and repeatability in spindle positioning, which in this application is about ±0.005", and operation under control of a machine controller that can be programmed to incorporate digital product definition data originating from an engineering authority for the wing and wing components, so that coordination features specified by the digital product definition can be placed accurately and repeatably by the machine tool 60. These two capabilities enable the machine tool 60 to apply coordination features, such as coordination holes and machined coordination surfaces, to parts, components and assemblies at precisely accurate positions specified in the digital product definition, or to use such coordination surfaces machined into the parts to orient the part to the digital space of the machine tool controller. Once the physical part and the digital part definition in the controller are aligned, the post mill is able to position parts and components relative to each other with great accuracy according to the original engineering part definition, so they are pinned and fastened exactly according to the design, thereby eliminating or drastically reducing the need for fixed hard tooling that previously was used to located the parts and components relative to each other. The coordination features thus determine the relative position of the parts and components that comprise the assembly, and thereby determine the size and shape of the assembly, independently of most tooling.

Figure 17:
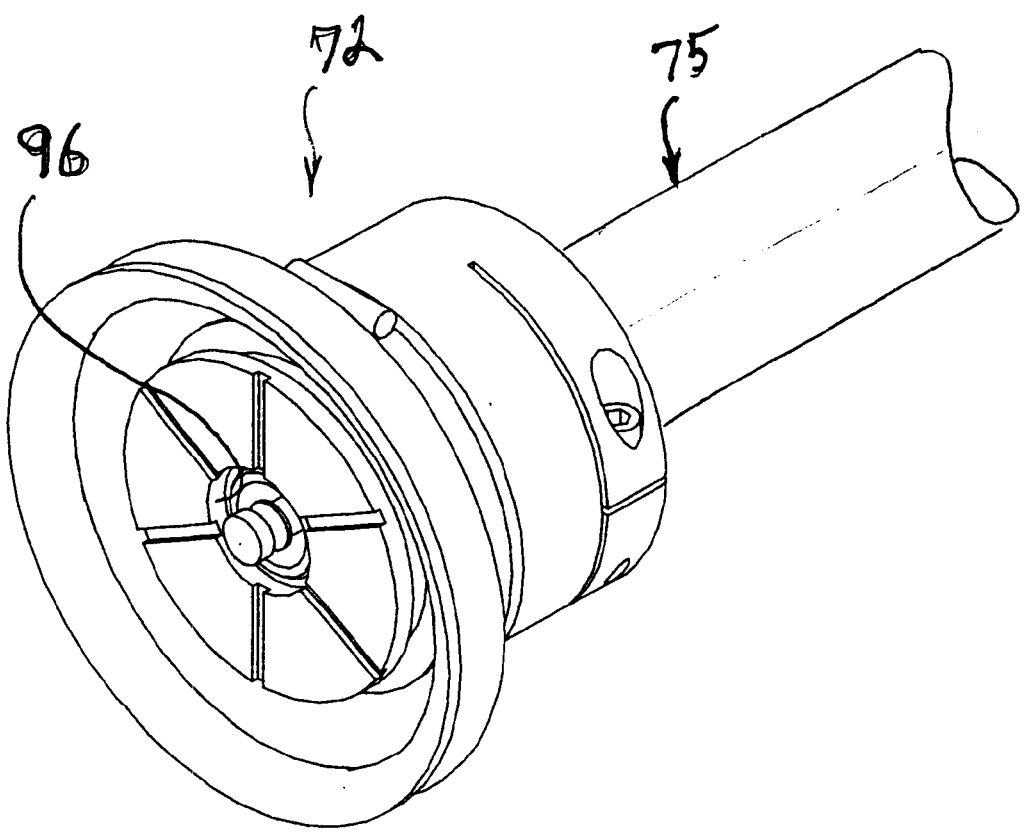
FIG. 17 is a perspective view of the vacuum head on the end of a pogo.
Figure 18:
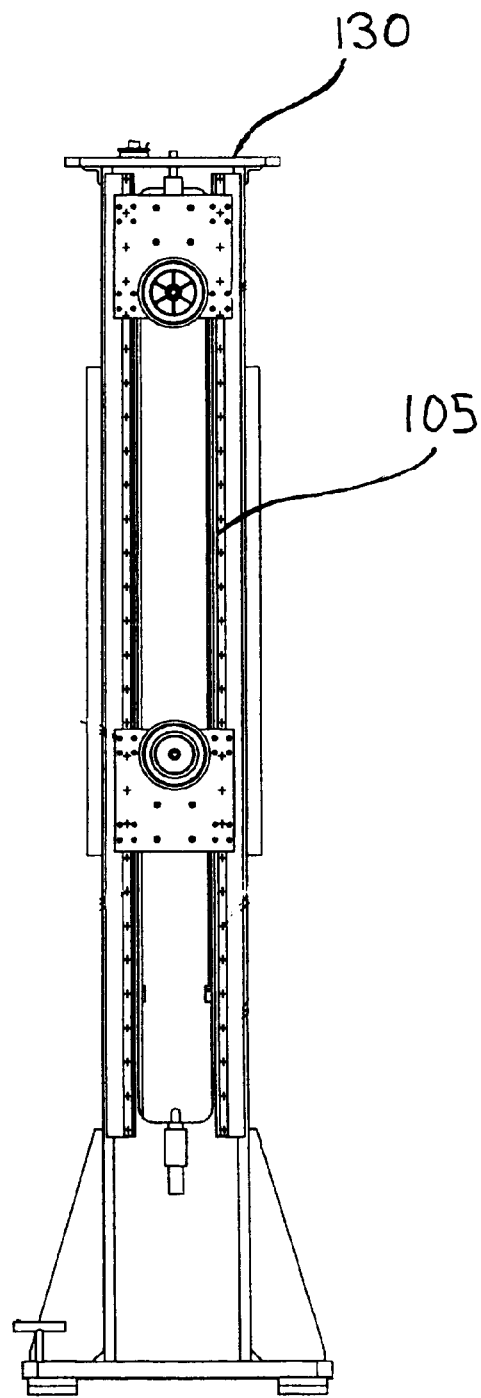
FIG. 18 is a front elevation of the tower shown in FIG. 5.
Figure 19:
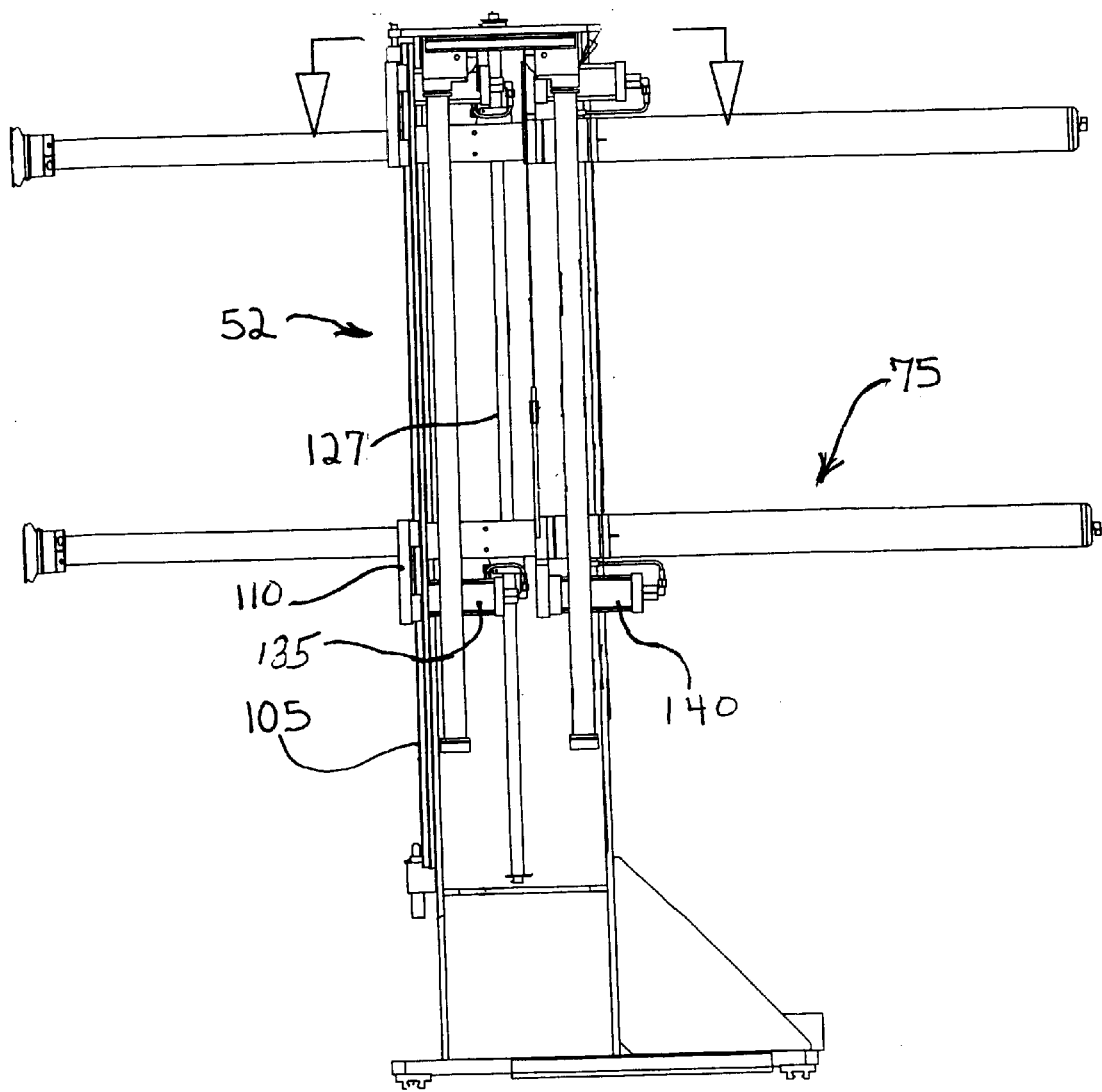
FIG. 19 is a sectional side elevation along lines 19—19 of the tower shown in FIG. 18.
Figure 20:
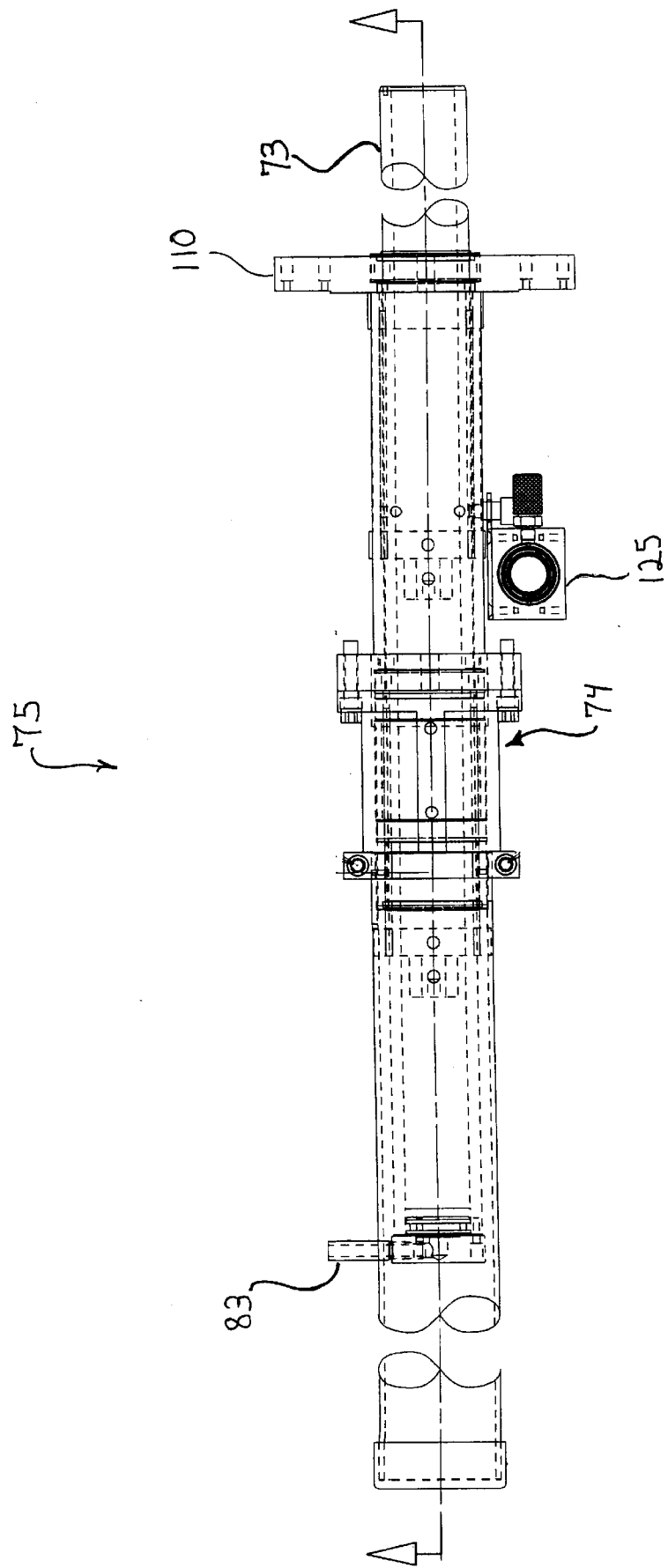
FIG. 20 is a plan view of a pogo assembly shown in FIG. 19.
Figure 21:
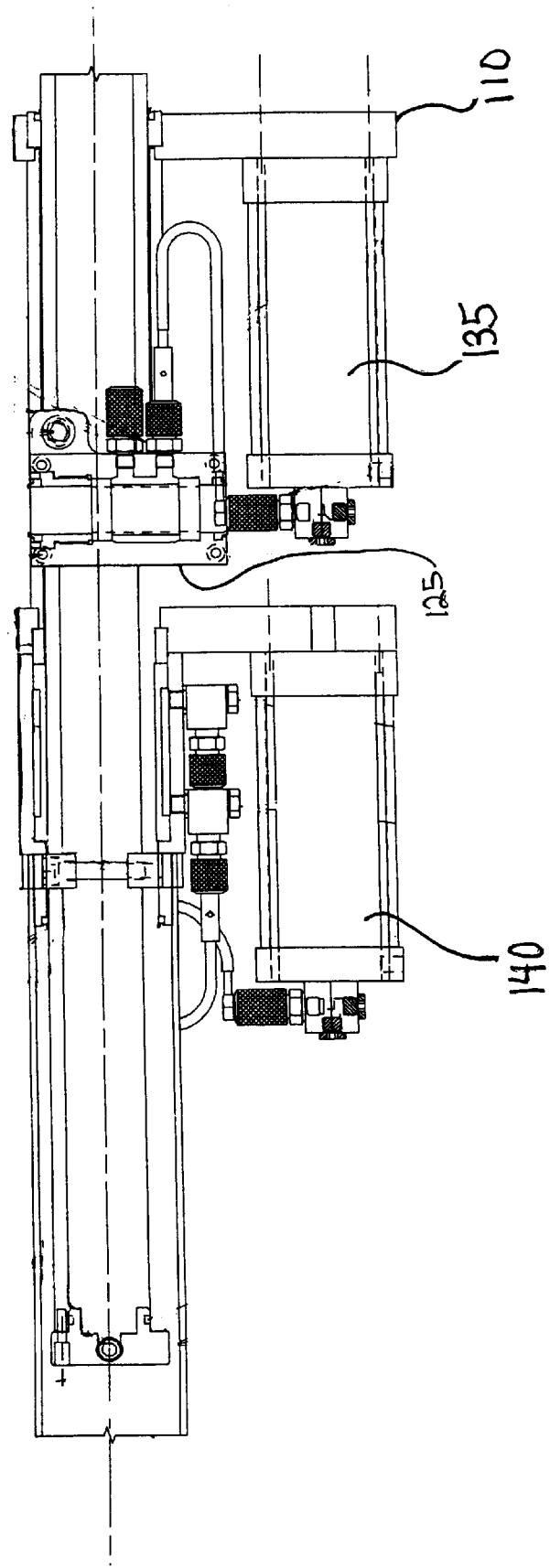
FIG. 21 is a sectional side elevation of a portion of the pogo assembly shown in FIG. 20.

A pogo setting tool 88, shown in FIGS. 13–16, has a coupling 90 that is engaged and held by the post mill arm 65, and a face plate 92 that contacts the vacuum head 72 on each pogo tube 73 to enable the post mill to set the longitudinal position of the towers 52 on the "X" axis and the vertical and lateral position of the pogos 75 in the "Y" and "Z" axes. A hardened center tubular bushing 94 is mounted in a central bore in the face plate 92. The outer peripheral edge of the bushing 94 is chamfered, so that it self-centers on a central opening 96 in the vacuum head 72, shown in FIG. 17. The space between the vacuum head 72 and the face plate 92 is sealed with a vacuum cup 98, and vacuum conveyed through the pogo 75 to the vacuum head pulls the vacuum head 72 against the face plate 92, while self-centering the vacuum cup onto the chamfered bushing 94. If the vacuum to the vacuum head 72 is turned off for any reason, a venturi vacuum generator 100 on the pogo setting tool 88 provides a vacuum conveyed through the bushing to pull the vacuum head 72 against the face plate 92 of the pogo setting tool 88.

With the vacuum head on the end of the pogo firmly held by the pogo setting tool on the end of the post mill arm 65, the post mill is able to move the pogo 75 and the tower 52 to the desired position for those elements. The easy movement of the pogos 75 on the towers 52 is made possible by the mounting of the pogos 72 on the towers 52. As shown in FIGS. 18–21, the towers 52 each have a pair of front rails 105 on which a mounting plate 110 is mounted by way of four sets of runner blocks 112 to guide the mounting plate 110 for self parallel vertical movement on the tower 52.

Figure 22:
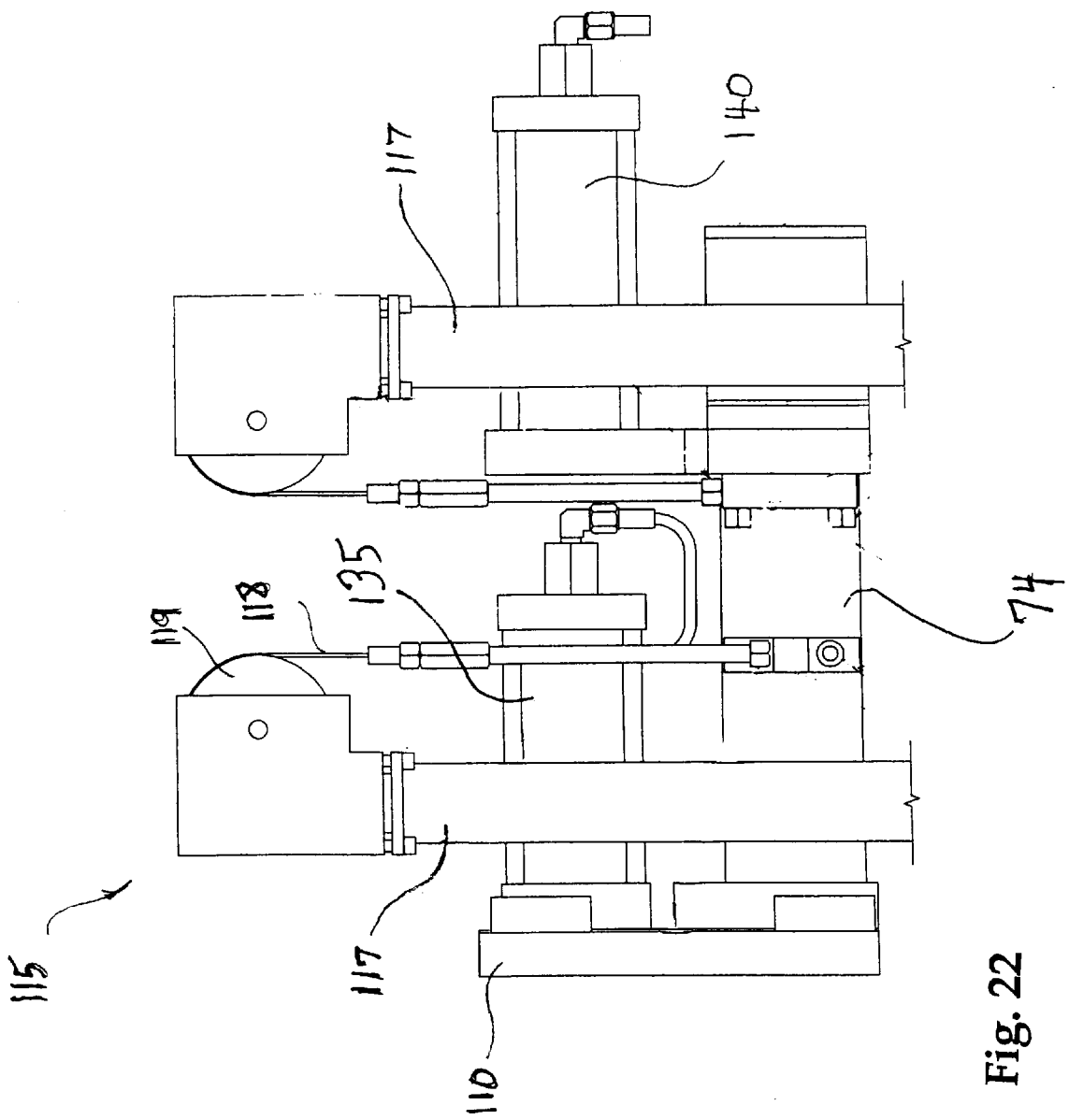
FIG. 22 is an enlarged side elevation of the top end of the tower shown in FIG. 19, showing the pogo counterbalance mechanisms.
Figure 23:
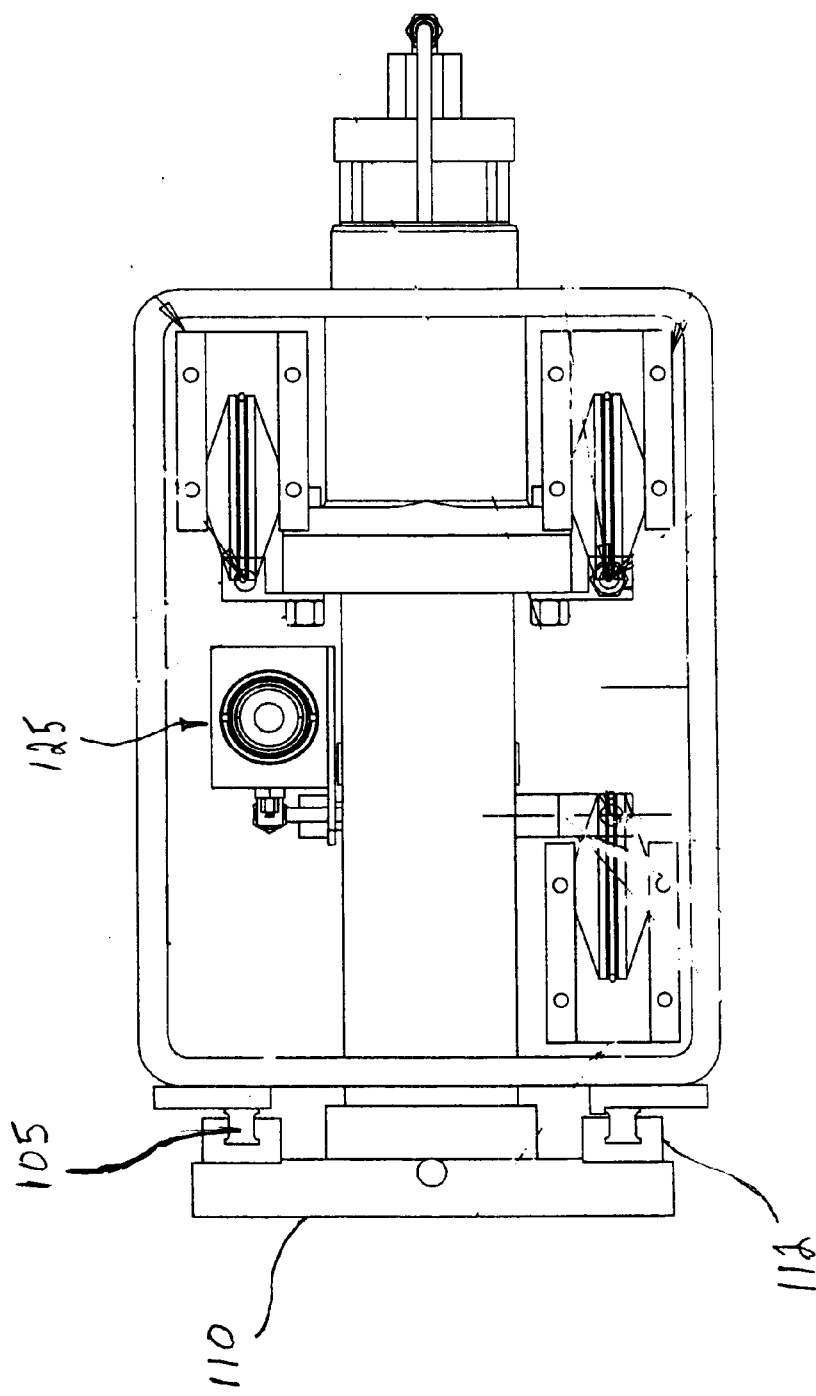
FIG. 23 is a plan view of the top of the tower shown in FIG. 19 with the top plate removed to expose the counterbalance pulleys and a vertical pogo clamp.
Figure 24:
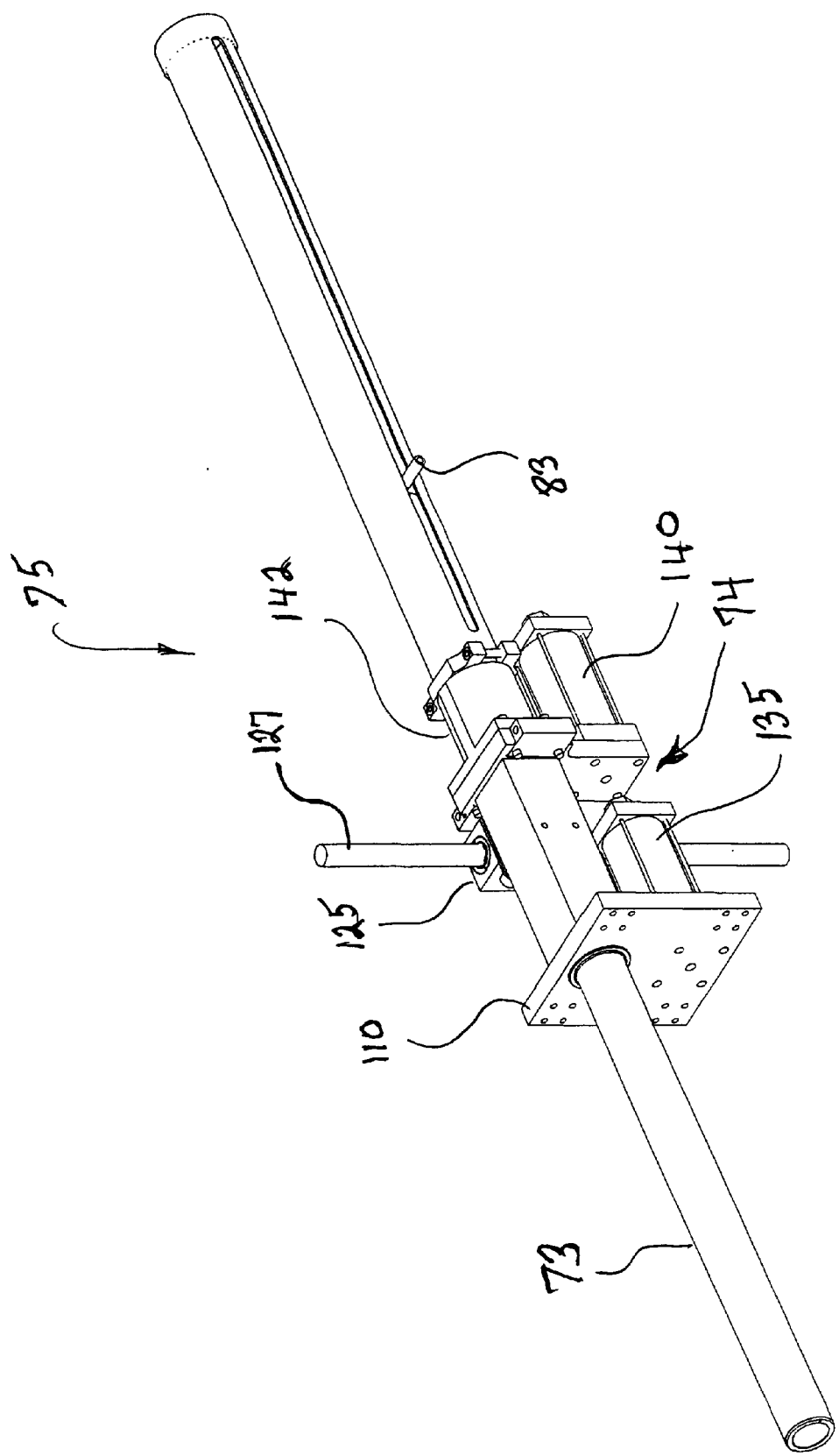
FIG. 24 is a perspective view of one of the pogo assemblies shown in FIG. 19.
Figure 25:
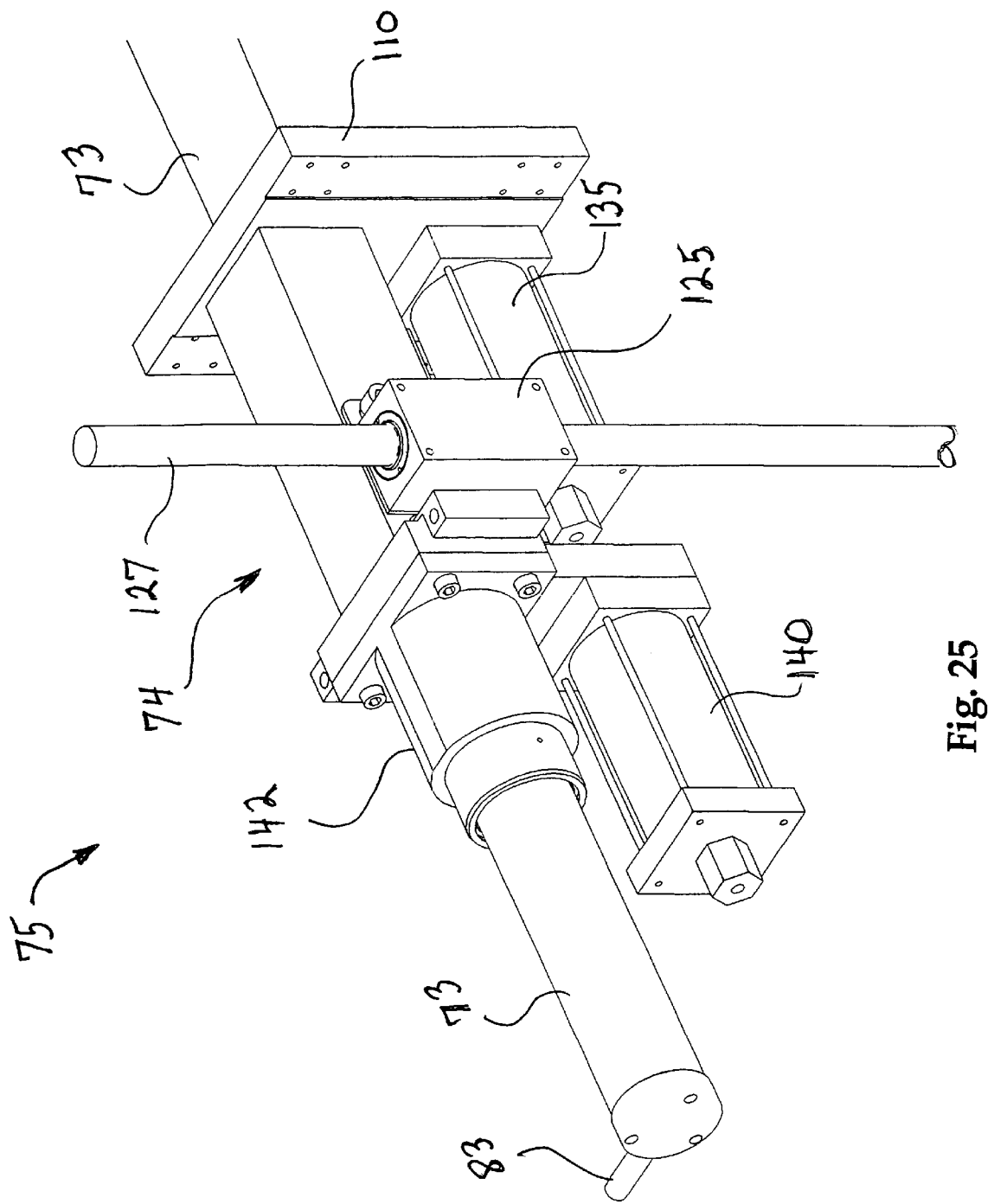
FIG. 25 is an enlarged perspective view of the central portion of the pogo assembly shown in FIG. 24 from the rear end, with the cover removed.

The weight of the pogos 75 and pogo mounting structures are counterbalanced by counterbalance mechanisms 115, each having a cable cylinder 117 such as the Tolomatic SA15 acting on a cable 118 trained over a pulley 119 as shown in FIGS. 22 and 23. The pressure in the cable cylinders is set to exert a constant force on the cables 118 sufficient to counterbalance the weight of the pogos 75 and their mounting structures, so the post mill 60 can easily move the pogos 75 up and down on the rails 105. The vertical position of the pogo 75 can be fixed at any desired elevation by a clamp 125 fixed to one side of the pogo 75 and slidably disposed on a rod 127 extending downward from a top plate 130 on the tower 52. The clamp 125 is a commercially available sleeve clamp made by Kostyrka in Germany and sold by urotech in Bookfield, Wis. Other sleeve clamps could also be used. Pressure to operate the clamp 125 is exerted by a spring-over-oil intensifier 135, which exerts a constant clamping force to close the clamp 125 on the rod 127 and hold the pogo at that vertical position. To release the clamp 125, air pressure is admitted to the intensifier to counteract the spring force and relax the fluid pressure on the clamp 125 to allow it to slide freely on the rod 127.

The lateral position of the front end of the pogo tubes 73 on which the vacuum heads 72 are attached is set by moving the post mill arm 65 and the pogo setting tool 88 to the desired lateral position in the "Z" direction and triggering a solenoid air valve to shut off the air pressure into a spring-over-oil intensifier 140 to allow the spring to pressurize the oil in the intensifier to squeeze the sleeve on a sleeve clamp 142, thereby clamping the pogo tube 73 in the clamp 142. The spring-over-oil intensifier with air pressure release is used to prevent inadvertent loss of position setting in the event of a momentary loss of air pressure.

The longitudinal position of each tower 52 in the "X" direction can also be set by the post mill acting through the pogo setting tool 88. The tower rolls freely in the "X" direction on the rails 61 and, when the desired position of the tower is reached, as determined by the feedback from the post mill, air pressure is applied to a brake 145 via a solenoid air valve (not shown) to lock the tower 52 in the desired position along the "X" axis.

Figure 26:
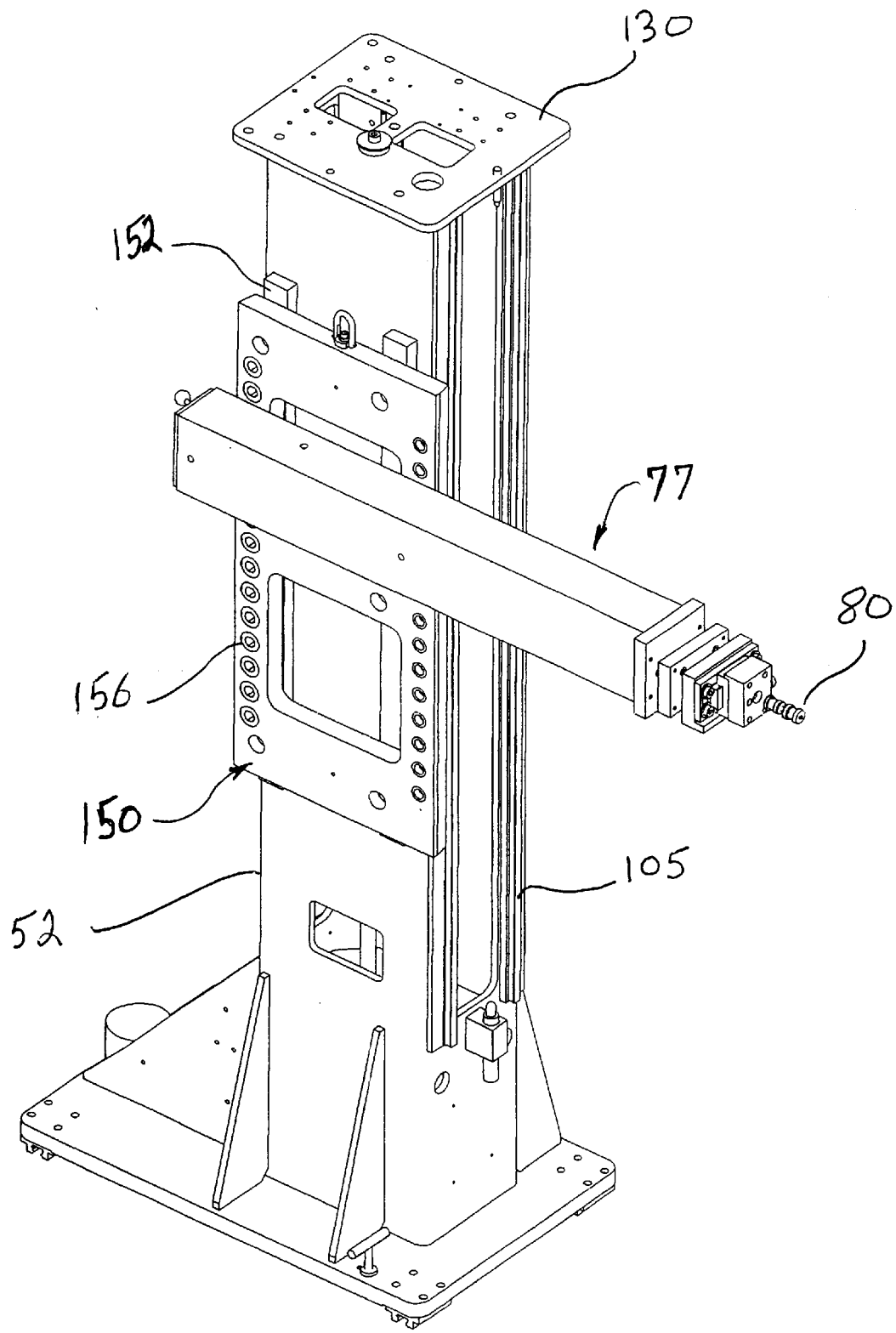
FIG. 26 is a perspective view of a tower with an index arm and index plate mounted thereon.

The position of the primary and secondary index arms 77 is set by the use of an index plate 150, shown in FIG. 26. The index plate 150 mounts to a tower 52 by way of a pair of vertical bars 152 fastened securely to the side of the tower. The bars 152 each have two spaced bushings 154, which receive fasteners by which the index plate 150 can be fastened to the side of the tower 52. The index plate 150 has a double column of bushings 156 spaced at intervals along opposite vertical edges, e.g. one inch apart. The primary index arm 77 is fastened to a desired pair of those bushings to project horizontally out from the tower. The position of the primary index pin 80 in space, as probed and recorded by a Renishaw probe held on the post mill arm, is the primary reference position and corresponds to the position of the primary coordination hole in the spar web 54 which receives the primary index pin when the web is mounted on the index arm 77.

Figure 27:
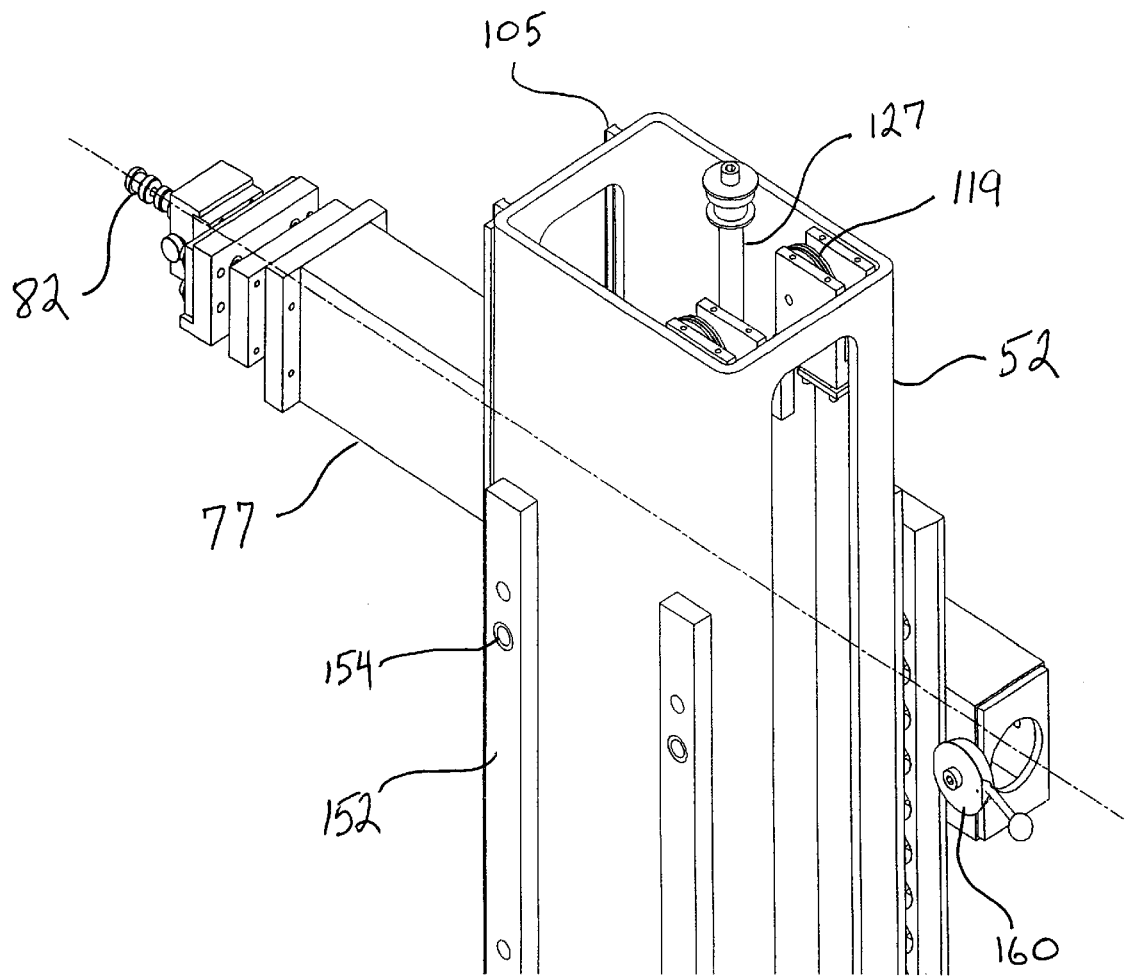
FIG. 27 is a perspective view from the rear of the upper portion of the tower an index arm shown in FIG. 26, with the top plate of the tower removed for clarity.
Figure 28:
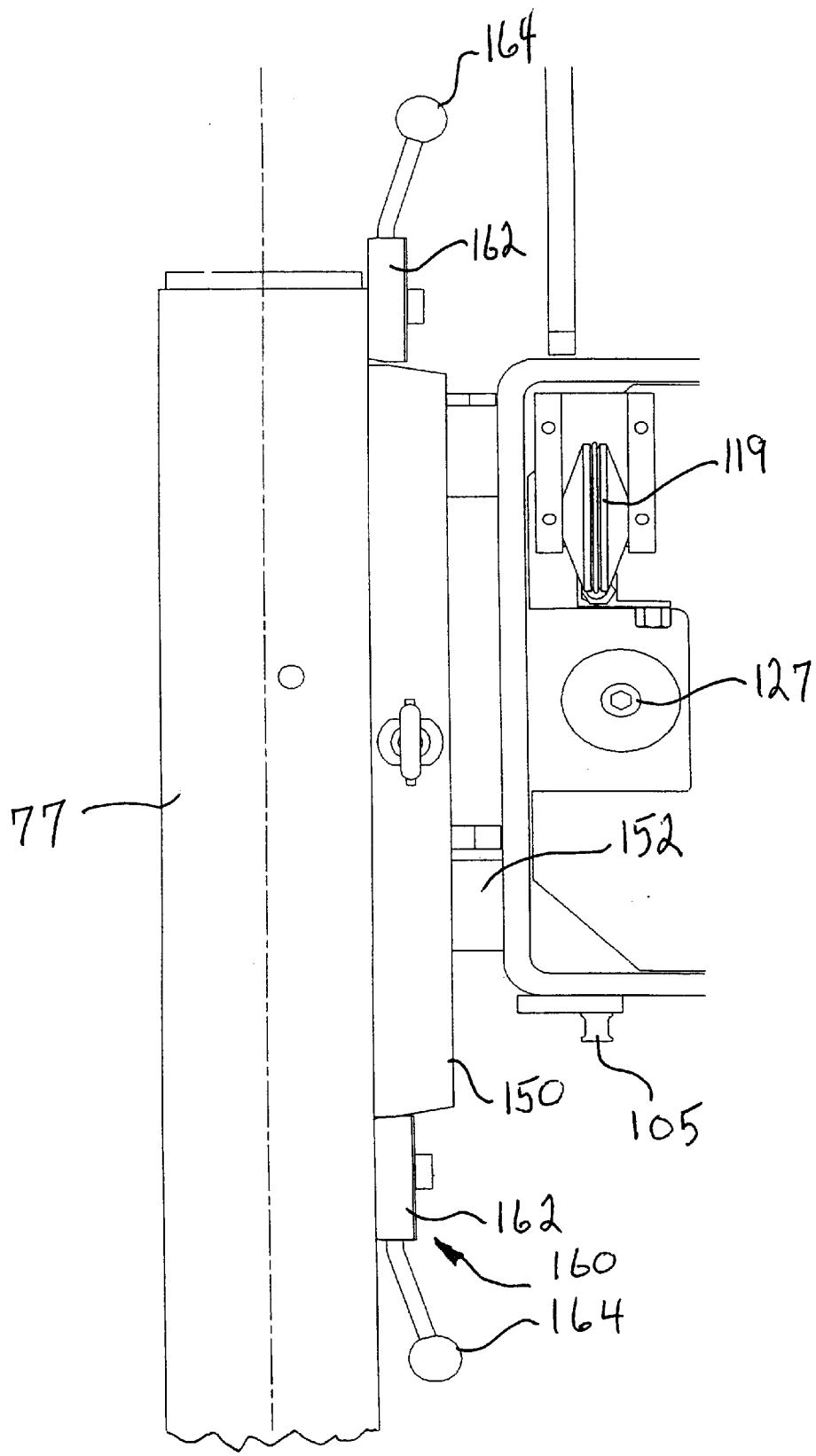
FIG. 28 is a top plan view of the tower and index arm shown in FIG. 27, showing the profile of the cam discs and the index plate.

The secondary index arms are identical to the primary index arm, so they are also designated by numeral 77 also. The secondary index arms are positioned using the bushings 156 in the index plate 150 and are attached to the index plate by a pair of cam locks 160, shown in FIG. 27. The cam locks 160 are eccentrically mounted circular discs 162 having a handle 164 by which the discs 162 can be turned and tightened against the index plate 150. The index plate has chamfered edges which engages oppositely chamfered surfaces of the discs 162 to force the index arm 77 tightly against the index plate 150 when the cam locks 160 are tightened.

After the cell is configured for the spar design to be built that day, the upper and lower spar chords 68 and 69 are loaded, onto temporary chord locators hanging on the pogos 75 for holding the spar chords adjacent to the spar web position in preparation for transfer to the spar web 54. It should be noted that, for convenience, the spar 30 is built in the inverted position because the lower edge of the spar diverges where the spar becomes wider at the inboard end, so building the spar in the inverted position reduces the reach of the scaffolding that may be needed by workers to reach the upper parts of the spar. Therefore, the drawings show the "upper" chord 69 in the bottom position and the "lower" chord 68 in the top position. The chords 68 and 69 are held in position on the temporary chord locators with over-center clamps 147 on the top and bottom ends of the chord locators. Sealant is applied to the vertical flange faying surface of the spar chords where they will contact the spar web 54. The spar web 54 is loaded onto the index pins 80 and 82 on the arms 64 and is drawn against the facing surfaces 84 of the vacuum heads 72 by vacuum in the vacuum cups 98.

The position of the upper and lower chords in the "Y" direction along the upper and lower edges of the spar web 54 is set by a series of chord-Y tools shown and described in the aforesaid U.S. Pat. No. 6,170,157. That description is incorporated by reference and will not be repeated herein.

After the chords and the web are accurately fixtured, a probing routine is performed to accommodate the deflection of the towers 52 and index arms 77 under the weight of the spar web 54 and chords. A probe held by the post mill arm 65 probes the primary index pin 80 and one or more secondary index pins 82 to locate their actual position. A suitable probe for this purpose would be a Renishaw contact tactile probe Model No. MP6 made by the Renishaw Company in Onendagua, N.Y., although other probes available from other sources could also be used. The machine controller for the post mill 60 uses the actual positions of the index pins 80 and 82 as located by the probe to normalize the part program in the controller to make it conform to the actual position of the parts on the towers 52.

The chords are now fastened to the web 54 with end effectors carried and positioned at the locations along the web 54 by the post mill arm 65. Suitable end effectors are illustrated and described in the aforesaid U.S. Pat. No. 6,170,157 and that description is incorporated herein by reference and will not be repeated here. Other end effectors can also be designed for specific tasks, as is well known in the art.

After all the fasteners for the upper and lower spar chords have been installed, the length distortion of the spar due to the radial and longitudinal compressive loading exerted by the interference fasteners is substantially complete. There will be additional fasteners installed when rib posts and stiffeners are fastened to the spar, but the length distortion, if any, produced by those operations can be accommodated after they are completed.

After the upper and lower chords have been attached, the post mill uses the same end effector or a separate drill only end effector to drill coordination holes for stiffeners and rib posts. As described below, a master digital model of the spar in the engineering authority for the airplane manufacturer specifies the location of the coordination holes for the rib posts and the stiffeners, and the part program which controls the movement of the post mill 60 is derived from that master digital model. The stiffeners and rib posts are attached in accordance with the process described in the aforesaid '157 patent.

A system is thus disclosed which is usable for assembling airplane wing ribs and spars to a high degree of precision. The determinant assembly concept embodied in this disclosure utilizes the spatial relationships between key features of detail parts and subassemblies, as defined in the digital design and represented by coordination holes and other coordination features put into the parts and subassemblies by a numerically controlled tool, using original part design data from the engineering authority, to control the relative location of detail parts in subassemblies and the relative relationship of subassemblies to each other, making the parts and subassemblies self locating. This concept eliminates the need for traditional hard tooling used for decades in the air frame industry and for the first time enables assembly of large, heavy, flexible and semi-flexible mechanical structures wherein the contour of the structure and the relative dimensions within the structure are determined by the parts themselves rather than the tooling.

Freed in this way from dependence on fixed tooling, the wing spar can now be built to accommodate distortion created by manufacturing processes, such as interference fasteners and cold working, so that attachment of critical features on the wing at precisely accurate positions specified by the engineering design can be scheduled in the manufacturing process after distortion by the upstream processes which would have affected their position or orientation on the wing. The factory can now manufacture wing spars of any shape and size for which engineering data is provided, within the physical range of the CNC machine tools, and do so faster and with far greater precision than was possible with fixed tooling. The cost of building and maintaining the conventional wing spar tooling, and the factory floor space for such fixed tooling, no longer need be amortized and factored into the price of the airplane, and it is now possible to build spars for wings customized to meet the particular requirements of particular customers.

Obviously, numerous modifications and variations of the system disclosed herein will occur to those skilled in the art in view of this disclosure. The invention is described as applied to a preferred embodiment, namely, a process of assembling airplane wing spars. However, it is contemplated that this invention has application to the assembly of parts into other kinds of major assemblies, generally, where adherence to a specified set of dimensional tolerances and final product contours and dimensions is desired. The invention has particular relevance where some or all of the parts and subassemblies are flexible or semi-flexible. It is specifically contemplated to use a larger version of the towers 52 to hold wing panels for probing to verify the desired contour and also for manufacturing operations such as drilling and riveting. Therefore, it is expressly to be understood that these modifications and variations, and the equivalents thereof, will be considered to be within the spirit and scope of the invention as defined in the following claims.

What is claimed is:

1. A method for positioning flexible or semi-flexible parts in space at desired positions and orientations for manufacturing and assembly operations, comprising:

positioning a series of part holding devices, one each on the end of a series of respective pogo on at least one movable fixture, in space at desired positions corresponding to points on a contour of one of said parts which is to be engaged by said part holding devices, said positioning of the part holding devices comprising:
     capturing each said part holding device with a capture device on a machine tool;
     physically moving each said captured part holding device along each of three orthogonal axes to said respective desired point position by moving said machine tool and said capture device; and
     locking said pogos on which the moved part holding devices are located in the desired positions to which they were moved by said machine tool, and releasing said part holding devices;
   positioning said one part against said part holding devices and holding said one part with said part holding devices in said desired position and orientation while performing manufacturing operations on said one part with said machine tool in juxtaposed relation to said at least one fixture.

2. A method as defined in claim 1, wherein:
   said holding step includes holding said part by vacuum against a vacuum head.

3. A method as defined in claim 1, wherein:
   said positioning of said part holding devices on said ends of said pogos includes physically moving said pogos on a vertical track with said machine tool to attain a desired vertical location of said part holding devices.

4. A method as defined in claim 1, wherein:
   said pogos are supported on movable towers supported on rollers to enable the towers to move freely when said machine tool captures and moves said part holding devices; and wherein said moving of the captured part holding devices includes moving the towers on the rollers, and said method also includes:
     locking said towers in desired tower positions with tower position locks after said machine tool moves said towers to said desired tower positions.

5. A method for positioning flexible or semi-flexible parts in space at desired positions and orientations for manufacturing and assembly operations, comprising:

positioning a series of part holding devices, each on the end of a pogo on at least one movable fixture, in space at desired positions corresponding to points on a contour of one of said parts which is to be engaged by said part holding devices, said positioning of the part holding devices comprising:
     capturing each said part holding device with a capturing means for capturing the part holding devices, said capturing means being on a machine tool;

physically moving each said captured part holding device to its respective desired point position by moving said machine tool and said capturing means; and locking said pogos on which the moved part holding devices are located in the desired positions to which they were moved by said machine tool, and releasing said part holding devices;

positioning said one part against said part holding devices and holding said one part with said part holding devices in said desired position and orientation while performing manufacturing operations on said one part with said machine tool in juxtaposed relation to said at least one fixture.

* * * * *